United States Patent [19]

Inoue et al.

[11] Patent Number: 4,714,940

[45] Date of Patent: Dec. 22, 1987

[54] IMAGE PROCESSING APPARATUS HAVING DISPLAY MEANS TO MONITOR AND DISPLAY INFORMATION FROM A DATE INPUT SECTION

[75] Inventors: Yutaka Inoue, Urawa; Mitsuru Kurata, Kawasaki; Nobuhiro Kasama, Yokohama; Masao Hosaka, Sagamihara; Toshiaki Yagasaki, Hino; Hiroshi Tanioka, Tokyo; Tadashi Yamakawa, Yokohama, all of Japan

[73] Assignee: Canon Kabushiki Kaisha, Tokyo, Japan

[21] Appl. No.: 639,142

[22] Filed: Aug. 9, 1984

[30] Foreign Application Priority Data

| Aug. 16, 1983 | [JP] | Japan | 58-149369 |
| Aug. 16, 1983 | [JP] | Japan | 58-149370 |
| Aug. 17, 1983 | [JP] | Japan | 58-149122 |
| Aug. 17, 1983 | [JP] | Japan | 58-149123 |
| Aug. 31, 1983 | [JP] | Japan | 58-158052 |
| Aug. 31, 1983 | [JP] | Japan | 58-158053 |
| Aug. 31, 1983 | [JP] | Japan | 58-158054 |
| Sep. 5, 1983 | [JP] | Japan | 58-161950 |
| Sep. 27, 1983 | [JP] | Japan | 58-177037 |
| Sep. 27, 1983 | [JP] | Japan | 58-177038 |
| Sep. 27, 1983 | [JP] | Japan | 58-177039 |
| Sep. 27, 1983 | [JP] | Japan | 58-177040 |
| Oct. 1, 1983 | [JP] | Japan | 58-181829 |
| Oct. 1, 1983 | [JP] | Japan | 58-181830 |
| Oct. 14, 1983 | [JP] | Japan | 58-190984 |
| Dec. 2, 1983 | [JP] | Japan | 58-226754 |

[51] Int. Cl.$^4$ .............................. G03G 15/04
[52] U.S. Cl. ....................... 355/3 R; 355/14 E
[58] Field of Search ................. 355/1, 3 R, 14 E, 40, 355/71; 350/346, 349, 345; 346/160; 358/296, 302

[56] References Cited

U.S. PATENT DOCUMENTS

| 4,110,794 | 8/1978 | Lester et al. | 355/3 R |
| 4,162,848 | 7/1979 | Platt, III | 355/464 |
| 4,239,374 | 12/1980 | Tatsumi et al. | 355/14 E |
| 4,317,115 | 2/1982 | Kawakami et al. | 340/784 |
| 4,330,813 | 5/1982 | Deutsch | 350/345 X |
| 4,472,050 | 9/1984 | Stockburger et al. | 355/40 |
| 4,487,481 | 12/1984 | Suzawa | 350/345 |

FOREIGN PATENT DOCUMENTS

| 56-16157 | 2/1981 | Japan | 355/3 R |
| 58-14861 | 1/1983 | Japan | 355/14 E |
| 80-00885 | 1/1980 | PCT Int'l Appl. | 355/5 |

OTHER PUBLICATIONS

*IBM Technical Disclosure Bulletin,* vol. 19, No. 7, Dec. 1976, Clark, W. D., "Copier Printhead", p. 2447.

*Primary Examiner*—Arthur T. Grimley
*Assistant Examiner*—J. Pendegrass
*Attorney, Agent, or Firm*—Fitzpatrick, Cella Harper & Scinto

[57] ABSTRACT

An image processing apparatus which has a function of simultaneously or selectively copy an image displayed on a display screen and an image on an original at an arbitrary location is disclosed. This apparatus includes a display unit which can be used as an original and be simultaneously used with the original and further can display at an arbitrary location on a placing unit for placing the original.

10 Claims, 44 Drawing Figures

FIG. 8-A
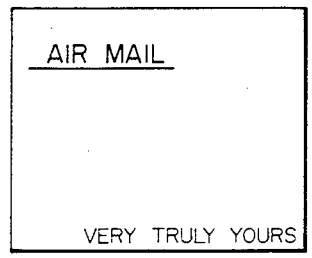
FIG. 8-B
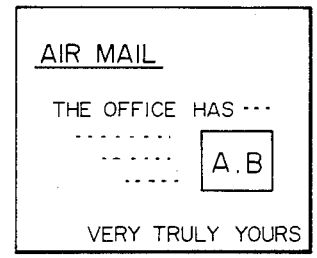
FIG. 9
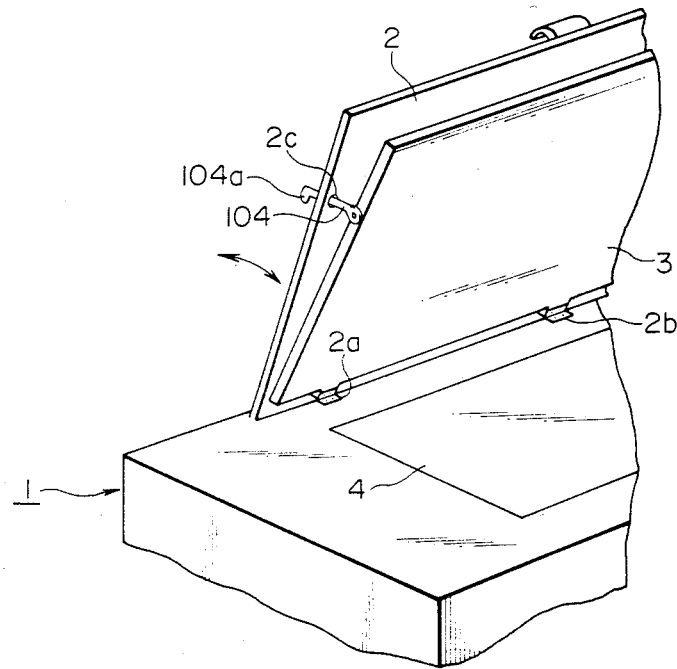

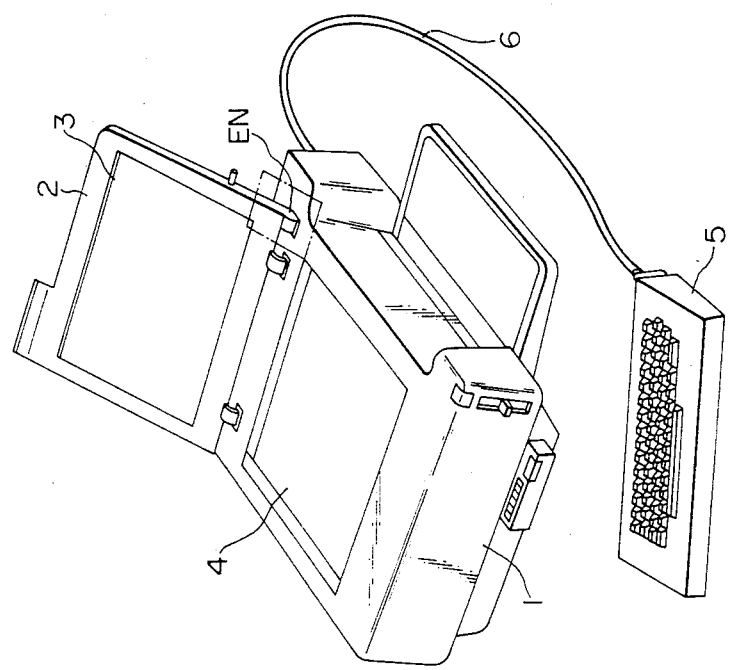
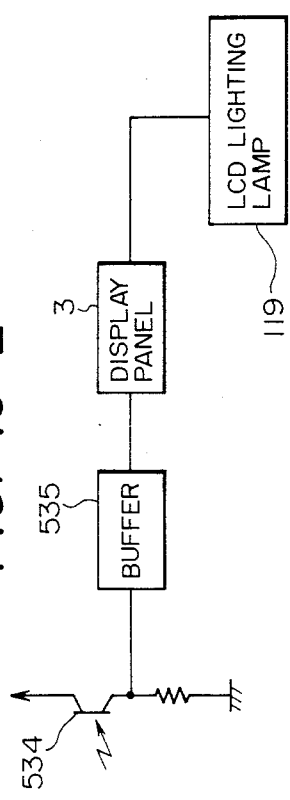
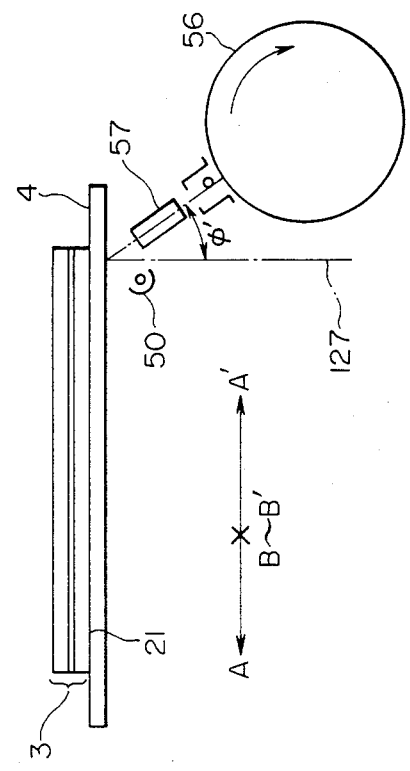

IMAGE PROCESSING APPARATUS HAVING DISPLAY MEANS TO MONITOR AND DISPLAY INFORMATION FROM A DATE INPUT SECTION

BACKGROUND OF THE INVENTION

1. Field of the Invention

The present invention relates to an image processing apparatus and, more particularly, to an image processing apparatus having display means to monitor and display information from a data input section.

2. Description of the Prior Art

A copying machine (or copier) is an example of an apparatus used to optically read an original and perform image processing. In typical copiers, a transparent original placed on an original plate is lit from under the original plate and the reflected light corresponding to densities of the original are focused by an optical system using a lens and the like, and an image of the original is formed on a light sensitive drum.

Recently, with regard to image processing apparatuses, an apparatus has been proposed which can hard-copy an image displayed on a display unit or the like, for example, an output from a computer or the like as well as an ordinary original in the manner similar to ordinary originals.

In the case of a display panel copy, a reflection type liquid crystal panel arranged with high density is disposed on an original presser plate of a copier and when this original presser plate (or original plate cover) is open, a display (e.g., liquid crystal) panel is made operative as a display medium for information. This display panel is constituted such that it is connected to a FAX system or an office computer, or it is connected as an output terminal of a word processor and the like from an external section in the company, in this way, it is used as one form for transmission of information, and that, if necessary, the cover is put down as in the manner to make an ordinary copy and the display is lit and scanned in order to retain that information as a hard copy.

FIG. 1 illustrates a perspective view of an image processing apparatus whereby a copier and a reflection type liquid crystal display of which an original cover of the copier is constituted by a reflection type liquid crystal display unit are combined. A reference numeral 1 denotes a copier of the electrophotographic system and 2 indicates an original cover which is constituted such that it has a reflection type liquid crystal display (or LCD) 3 formed so that it can cover an original plate glass 4. The reflection type LCD 3 is connected to a personal computer 5 equipped with a keyboard through a cable 6. The original cover 2 has such a structure as to protect the display screen 3.

With such an arrangement, processing information is first displayed on the display screen by use of the display screen 3 as an output of a console of the computer 5 and after confirming the content displayed, by putting down the reflection type LCD 3 on the cover and by setting a copy key on the copier main part 1 or on the keyboard to start the copying operation, a hard copy of the display content can be easily obtained. Particularly, when the computer 5 is used as a word processor, after correcting and confirming a document outputted on the display screen 3, the document is obtained as a hard copy as it is, so that it is extremely effective regarding its operability. On one hand, in the system which adopts a local area network and can perform the transfer and the like of information by combining a plurality of computers 5, image information is transferred among, offices and the like and the image information is transferred on the display screen 3 and is output thereon. After confirming the content displayed, only the necessary information can be easily left as a hard copy, so that it is very useful. Moreover, if the area on the screen is ordinarily all blank, the copier 1 can be obviously used as a general copying machine for documents; therefore, this system is valuable as an apparatus of which an equipment which is generally used for office works was constituted as a compact apparatus.

FIG. 2 illustrates an internal constitutional diagram of the copier 1. The closable original presser plate 2 is arranged over the original placing section 4 consisting of transparent member and this presser plate 2 serves to press and closely retain an original placed on the upper surface of the original placing section 4; this is similar to that in this kind of well known copier. The display panel 3 consisting of reflection type liquid crystal cells is arranged on the inner surface of the original presser plate 2 in the manner such that it is closely retained on the original placing section when it is closed. Output information from a computer or the like (not shown) is displayed as an image.

Therefore, when the output image is displayed on the LCD panel 3, by performing the copying work similarly to the case where an original which is copied is placed on the corresponding location, the output image is lit by an exposure light source 50 provided in the copier. Thus, the reflection light responsive to the output image is formed on a light sensitive material 56 through mirrors 51 and 52, optical system 53, and mirrors 54 and 55. Thereafter, a hard copy of the image displayed on the LCD panel will be theoretically obtained in the manner similar to the that performed in well known copiers.

However, practically speaking, if the image on the LCD panel 3 is merely used as it is in place of using an ordinary document or the like as an original, a clear copy cannot be derived because of the lack of proper illumination.

On the contrary, even if the illumination is increased, the whole copy will be made light and will cause drawbacks such that it is difficult to obtain good gradient and that the electric power consumption also increases.

The above-mentioned LCD panel 3 is, for instance, of the reflection type LCD cells of the publicly known twisted nematic type and its cross sectional structure is shown in FIG. 3-1. Namely, transparent electrodes E and E are arranged respectively on the inner surfaces of two sheets of transparent substrates G and disposed in parallel. The space between the transparent substrates held through spacers S is filled with a liquid crystal L. Numerals 26 and 27 denote deflecting plates and 28 is a reflecting plate. As is well known, the action of such a LCD panel is such that the light projected from the direction indicated by an arrow a in FIG. 3-1 is deflected by the deflecting plate 26 and progresses, and at this time it is determined whether or not the light emission is performed at the portion of the liquid crystal L in dependence upon whether or not an electric field is applied to the electrodes E, then the light further progresses and it is discriminated by the deflecting plate 27 whether or not the light is allowed to pass therethrough. The light passed through the deflection plate 27 (namely, the deflected light) is reflected by the reflecting plate 28 and it is again determined whether or not it is allowed to pass through the deflecting plate 27, liquid crystal L and deflecting plate 26 in the similar manner as mentioned above in dependence upon the presence and absence of the electric field. Therefore, when it is assumed that one pixel is constituted by a pair of such electrodes E and by arranging a number of such pairs and by appropriately determining whether or not the electric field is applied to each pair, a picture image can be formed.

In case of forming an image using the LCD panel in this way, there are many elements to attenuate the light until the projection light passes through the LCD panel and is again radiated to the outside, so that an amount of reflected light is less than an amount of projected light. Therefore, this method is disadvantageous to perform copying by the above-mentioned method shown in FIG. 2.

Further, in the copying method shown in FIG. 2, the light at the portion having a large amount of light in the mirror reflecting direction (refer to FIG. 3-2 which illustrates an explanatory diagram of the mirror reflection) is not used, but the light at the portion of the diffused reflection is ordinarily used as the light which is finally projected onto a light sensitive material among the lights which were projected from the light source 50 onto the original surface. This is because the use of the reflected light in the mirror reflecting direction causes the contrast of the original to deteriorate due to influence by the reflected light from the surface of the glass plate of the original placing section 4. In FIG. 3-2, a numeral 3a denotes a reflecting plate and 57 is an optical system and the light from the light source 50 is reflected by the reflecting plate 3a. This reflected light includes a larger amount of mirror reflected components (in the direction of b) and a less amount of light which reaches the optical system 57.

This fact is fundamentally similar to the case of using the reflection type LCD plate as an original as mentioned before. It is in fact impossible to use such a plate as an original for a copier when the reflecting surface of the reflecting plate 28 is a complete mirror reflecting surface. Also, even if the reflecting surface is an irregularly reflecting surface, a sufficient amount of light cannot be obtained since the liquid crystal cells themselves have a large attenuation property as mentioned before, so that it is difficult to derive a clear picture image.

On the other hand, in the composite image processing apparatus shown in FIG. 1, it is impossible to simultaneously execute in parallel the hard copy process of the image which was monitor-displayed on the display means and the hard copy process of another image of an original, for instance, written on a paper for an original. For example, when an LCD device is used as the display means, the location of the image displayed on the LCD panel which was led onto the exposing location of the original (i.e., on the original plate glass) differs from the location of the image of the original placed on the original plate glass. Namely, as shown in FIG. 4, in case of the LCD panel, the liquid crystal L serving as the image forming section is held in the space which is constituted by the spacers S, supporting glass plates G and transparent electrodes E. On the other hand, since the original is directly placed on the original plate glass and is pressed by the supporting glass plate G, the location (or level) of the image differs by an amount corresponding to at least the thickness of this supporting glass plate G. It is necessary to compensate this difference in level between both images by varying the image forming process such as, for example, by adjusting a focal point by changing the location of the exposing lens, or the like. Thus, this certainly makes the apparatus complicated. In addition, since it takes a constant period of time to perform the focal point adjusting operation, it is impossible to simultaneously copy both of the image displayed on the LCD means and the image of the original and thereby to synthesize a clear hard copy.

It is also impossible to simultaneously write both images at an arbitrary portion on the original. That is, there is a drawback such that the simultaneous writing portion by the screen of the original has to be preliminarily cut away or the original has to be made of transparent material such as an OHP (overhead projector) sheet or the like.

On the other hand, since the above-mentioned image processing apparatus is constituted on the premise that it can be operated as an ordinary copier, the original plate is arranged such that an original of an A3 size is laterally placed thereon in general when it is seen from the operator side in order to enable an original of up to an A3 size to be copied. Therefore, the information transmitted is displayed on the plate display having a format of which the A3 size is placed laterally. However, the formats of information generally differ depending upon the content of the information. For example, in the case where the A3 information is written laterally in the direction along the short side, there is a drawback such that even if it is displayed as it is, the operator cannot easily read it. In addition, in the display format whereby the information of the A3 size is reformed from the longitudinal direction to the lateral direction so that the information can be easily read, in the case where it is copied by putting down the display unit in this state, another drawback will be caused whereby there is inconvenience such that the A3 information cannot be reproduced on a sheet of A3 transfer material.

On the other hand, in the above-mentioned apparatus, the display 3 and personal computer 5 as illustrated in FIG. 1 are connected through the cable 6 and the signals are transmitted and received therebetween by this cable. The display 3 is opened and closed when the display image is checked and copied. Therefore, whenever it is opened and closed, this could make the mechanical burden too heavy for the cable 6 and connectors and the like, causing a problem of damage such as the breaking of signal lines in the cable and the like. As the number of signal lines in the cable increases, the risk of such a damage increases more and more.

Further, in such an apparatus, since the copying apparatus and display apparatus are mutually independently provided, to reset the display apparatus into the state in that the copy is possible after an image has been once displayed on the display apparatus, the original cover has to be once put down on the original plate. Thereafter, the copy is done by further setting the copy start button of the copier main body. Therefore, in the case where, e.g., the display screen (information) on the display apparatus is sequentially changed and information is checked and correcte and then copied, namely, in the case of repeating such operations, the above-mentioned copying operation has to be performed every time. Also, after closely pressing and sticking the display apparatus on the original plate glass, the copy start button is depressed to obtain a hard copy. Consequently, there is a drawback such that the operations are very troublesome and difficult.

Moreover, if the copy button is depressed after completion of the inputting operation to the display apparatus and the image processing operation is executed, the leading time until the image processing can be performed becomes vain. Conversely, if the image processing operation has been preliminarily enabled before the information is input to the display apparatus, there is a drawback such that it is undesirable from the viewpoint of power saving.

On one hand, in the above-mentioned apparatus, when the display means of the TN type is employed as the LCD panel, the deflecting plates are used to provide the visible information, so that an amount of reflected light forming an optical image largely attenuates as compared with an amount of light which is radiated onto the display surface. Therefore, although there is no problem in particular when the display information is directly observed with the naked eye, as an optical image which is applied to a conventionally well known light conductive layer, a drawback is caused whereby proper illumination is lacking and a clear hard copy with large contrast cannot be derived.

In addition, in case of a copier, the exposing light source is generally arranged such that it can obtain a copy of the image written on the material which is ordinarily the irregular reflecting surface. On the other hand, in case of the image formed in the liquid crystal cells, it is well known that a difference is caused in image contrast in dependence upon the location of the light source and the direction where the picture image is observed. Therefore, as mentioned before, by merely using a well known copier and placing the image of the liquid crystal cells on the original placing section, a good contrast image cannot be applied onto the light sensitive material in the copier.

The difference in contrast in the liquid crystal cells depending upon various directions will then be discussed. In FIGS. 5-1 and 5-3, a numeral 21 indicates a display surface of the liquid crystal cell and a point O is used as a contrast measuring point. A numeral 22 represents a plane which passes through the point O and is perpendicular to the plate 21. For this plane 22, FIG. 5-2 shows a curve on a graph whereby a contrast ratio is shown with respect to an angle $\phi_A$ in the case where a brightness measuring instrument 24 is rotated in the plane 22 around the point O as a rotational center from a point A to a point A'. FIG. 5-3 shows the case where the contrast ratio is measured in the similar manner as mentioned above along the plane which passes through the point O and includes a straight line B-B' which perpendicularly crosses a straight line A-A'. FIG. 5-4 shows a value of the contrast ratio regarding an angle $\phi_B$.

In FIGS. 5-2 and 5-4, the solid lines indicate the case of the TN type liquid crystal, while the broken line represents the case of the GH type liquid crystal, respectively. It can be seen soon from these graphs that the maximum contrast (visual dependability) is obtained in the direction perpendicular to the liquid crystal surface when the image is seen from the direction indicated in FIG. 5-3, while the maximum contrast (visual dependability) is derived at the location which is about 40° apart from the location perpendicular to the display surface in the direction indicated in FIG. 5-1. This is remarkable in the TN type liquid crystal, but the GH type liquid crystal also has a similar tendency.

The above description will now be summarized as follows. In this way, in case of the LCD apparatus, the light and shade are caused in its output image depending upon the directions where it is seen. Thus, when the liquid crystal display surface is attached onto the original presser plate of the copier mentioned above or the like, there is a problem of occurrence of the case where even if an image is displayed on the display surface, it is difficult to see the image.

SUMMARY OF THE INVENTION

In consideration of the above-mentioned points, it is an object of the present invention to provide an image processing apparatus of the multifunction type which can simultaneously or selectively copy an image displayed on a display screen and an image on an original at an arbitrary location.

Another object of the present invention is to provide an image processing apparatus which can convert an image displayed on the display screen to the image in the direction where it can be easily seen by an operator.

A further object of the present invention is to provide an image processing apparatus in which an original and a display section are set into substantially the same level.

Still another object of the present invention is to provide an image processing apparatus in which a reflecting plate which is used in the display section is substituted by a member forming an irregularly reflecting surface such as an original or the like, and the information on the original and the information on the display section are further added and a hard copy can be obtained.

In addition, another object of the present invention is to provide an image processing apparatus which is constituted such that the direction of the mirror reflected light at the display section coincides with the direction of the optical system in the image processing.

It is also an object of the present invention to provide an image processing apparatus whereby, in case of obtaining a hard copy from an image displayed on the display surface, the optical system in the image processing apparatus is arranged at a location where its contrast becomes maximum, thereby enabling a clear copy with high contrast to be derived.

A further object of the present invention is to provide an image processing apparatus which can set the display surface into a location where it can be easily seen by an operator.

An additional object of the invention is to provide an image processing apparatus in which a reflecting layer is arranged on the back side of the liquid crystal display surface, thereby to obtain a contrast enough to see with the naked eye, and at the same time in the case where the image on this display surface is used as an original for copy, a light source is radiated from the back side of the display surface in the manner such that a latent image corresponding to the image on the display surface is formed in the light conductive layer in the copier, thereby enabling a clear copy to be obtained.

A still further object of the invention is to provide an image processing apparatus in which a plurality of light emitting elements are arranged on the back side of a liquid crystal display panel disposed on an original presser plate and in case of seeing an output image on the display panel, the whole display surface is uniformly illuminated and the image with high contrast can be observed, while in the case where a hard copy is obtained using this image as an original, only the light emitting elements at a desired portion are illuminated with high brightness and a clear copy can be derived with small electric power consumption.

A specific object of the invention is to provide an image processing apparatus in which a transmission type LCD is used as a display section and lighting means for such an LCD is arranged in a presser plate of image processing means, thereby enabling a hard copy of the monitor display image to be obtained with a clearer gradient.

Yet another object of the invention is to provide an image processing apparatus in which liquid crystal cells which need no deflecting plate are used as the display section, thereby enabling a clear hard copy with large contrast to be obtained without modifying the apparatus itself.

A more specific object of the invention is to provide an image processing apparatus which can certainly perform the transmission of complicated signals between the display section and the image information inputting or outputting section by means for generating and receiving optical signals by way of a simple structure.

Another specific object of the invention is to provide an image processing apparatus which is constituted such that it has a first display unit to display a first display content and a second display unit to display a second display content and that the display content of the second display unit is optically read and the display content of the first display unit is transferred to the second display unit, thereby improving its operability and enabling the operating time to be extremely shortened.

Further another object of the invention is to provide an image processing apparatus in which data inputting means, display means for displaying an image in response to an information signal from the data inputting means and image processing means which can copy an image of this display means are integrally constituted as a system, and in which the image processing means is activated into the state in that the image can be formed when operating means (e.g., a keyboard) to the data inputting means is operated.

Still another object of the invention is to provide an image processing apparatus in which data inputting means, display means which can monitor-display in response to an information signal from this inputting means and can shift the display panel to the original exposing location, displacement sensing means of this display means, and image processing means for recording an image arranged at the original exposing location are integrally constituted as a system, and in which the standby process for the image processing means is started in response to a signal of the data inputting means and the image processing process is started in response to a signal from the displacement sensing means.

Further to the above-mentioned points, the present invention can provide an image processing apparatus of the multifunction type which can simultaneously or selectively copy an image displayed on a display screen and an image on an original at an arbitrary location.

The present invention is one embodiment comprises an image processing apparatus which can convert an image displayed on the display screen to the image in the direction where it can be easily seen by an operator. An image processing apparatus is provided in which an original and a display section are set into substantially the same level. A reflecting plate, which is used in the display section, is substituted by a member forming an irregularly reflecting surface such as an original or the like, and the information on the original and the information on the display section are further added and a hard copy can be obtained. The direction of the mirror reflected light at the display section coincides with the direction of the optical system in the image processing. In case of obtaining a hard copy from an image displayed on the display surface, the optical system in the image processing aparatus is arranged at a location where its contrast becomes maximum, thereby enabling a clear copy with high contrast to be derived.

An image processing apparatus in another embodiment of the invention can set the display surface into a location where it can be easily seen by an operator. A reflecting layer is arranged on the back side of the liquid crystal display surface, thereby to obtain a contrast enough to see with the naked eye, and at the same time in the case where the image on this display surface is used as an original for copy, a light source is radiated from the back side of the display surface in the manner such that a latent image corresponding to the image on the display surface is formed in the light conductive layer in the copier, thereby enabling a clear copy to be obtained. A plurality of light emitting elements are arranged on the back side of a liquid crystal display panel disposed on an original presser plate and in case of seeing an output image on the display panel, the whole display surface is uniformly illuminated and the image with high contrast can be observed, while in the case where a hard copy is obtained using this image as an original, only the light emitting elements at a desired portion are illuminated with high brightness and a clear copy can be derived with small electric power consumption. A transmission type LCD is used as a display section and lighting means for such an LCD is arranged in a presser plate of image processing means, thereby enabling a hard copy of the monitor display image to be obtained with a clearer gradient. Liquid crystal cells which need no deflecting plate are used as the display section, thereby enabling a clear hard copy with large contrast to be obtained without modifying the apparatus itself.

The inventive image processing apparatus can also certainly perform the transmission of complicated signals between the display section and the image information inputting or outputting section by means for generating and receiving optical signals by way of a simple structure.

An embodiment of such an image processing apparatus is constituted such that it has a first display unit to display a first display content and a second display unit to display a second display content and such that display content of the second display unit is optically read and the display content of the first display unit is transferred to the second display unit, thereby improving its operability and enabling the operating time to be extremely shortened. Data inputting means, display means for displaying an image in response to an information signal from the data inputting means and image processing means which can copy an image of this display means are integrally constituted as a system, and in which the image processing means in activated into the state in that the image can be formed when operating means (e.g., a keyboard) to the data inputting means is operated. Data inputting means, display means which can monitor-display in response to an information signal from this inputting means and can shift the display panel to the original exposing location, displacement sensing means of this display means, and image processing means for recording an image arranged at the original exposing location are integrally constituted as a system, and in which the standby process for the image processing means is started in response to a signal of the data inputting means and the image processing process is started in response to a signal from the displacement sensing means.

BRIEF DESCRIPTION OF THE DRAWINGS

FIG. 3-1 is a diagram showing a cross sectional structure of reflection type liquid crystal cells of the twisted nematic type;

FIG. 3-2 is a diagram to explain the mirror reflection;

FIGS. 5-1 to 5-4 are diagrams showing the contrast ratios in the liquid crystal cells depending upon the directions, respectively;

FIG. 6-1 is a diagram showing a functional arrangement of the image processing apparatus;

FIG. 6-2 is a diagram showing a fundamental system circuit of the image processing apparatus;

FIG. 6-3 is a diagram showing a fundamental arrangement of a liquid crystal panel;

FIG. 7-1 is a perspective view illustrating a copier;

FIG. 7-2 is an arrangement diagram of an original plate constituted by a transparent film;

FIGS. 8-A and 8-B are diagrams to explain the overlay;

FIG. 9 is a diagram to explain an original presser plate to which the present invention is applied;

FIG. 15-1 is a diagram showing a light emitting member and a drive circuit to drive it;

FIG. 15-1 is a diagram showing a control circuit to control the lighting of an LCD lighting lamp;

FIG. 16 is an arrangement diagram of an image processing system;

FIG. 17 is a perspective view illustrating an image processing apparatus to which the present invention is applied;

DETAILED DESCRIPTION OF THE INVENTION

The invention will now be described in detail hereinbelow with reference to the drawings.

Figure 1:
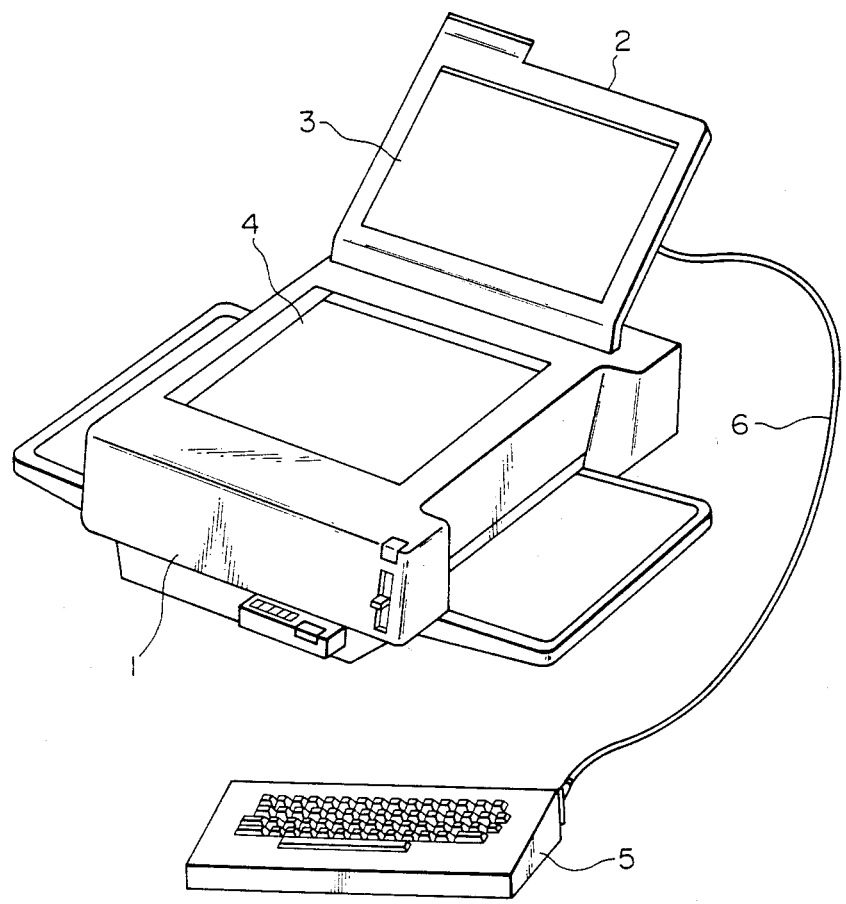
FIG. 1 is a perspective view showing an image processing apparatus.
Figures 1, 6:
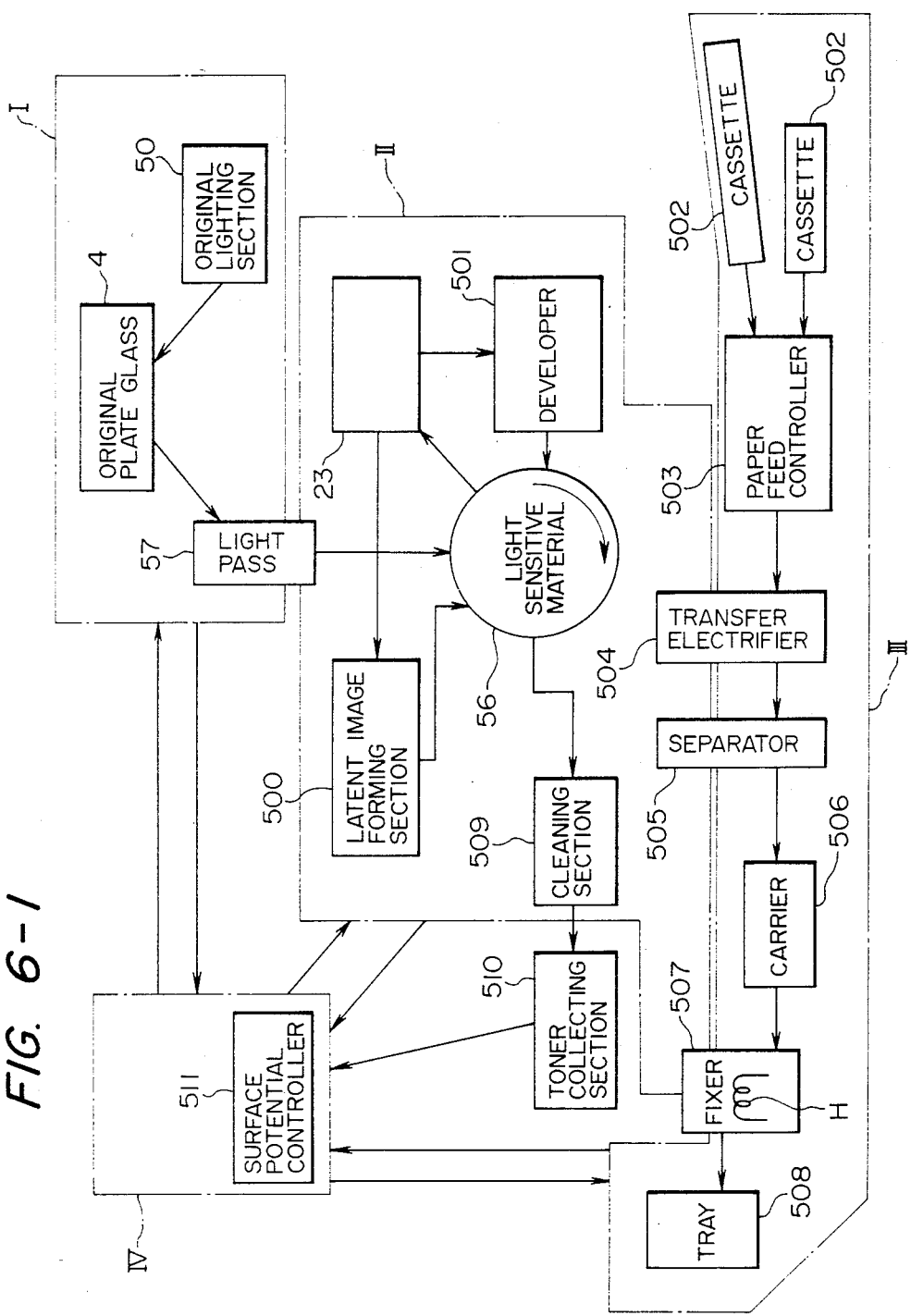
Figures 2, 6:
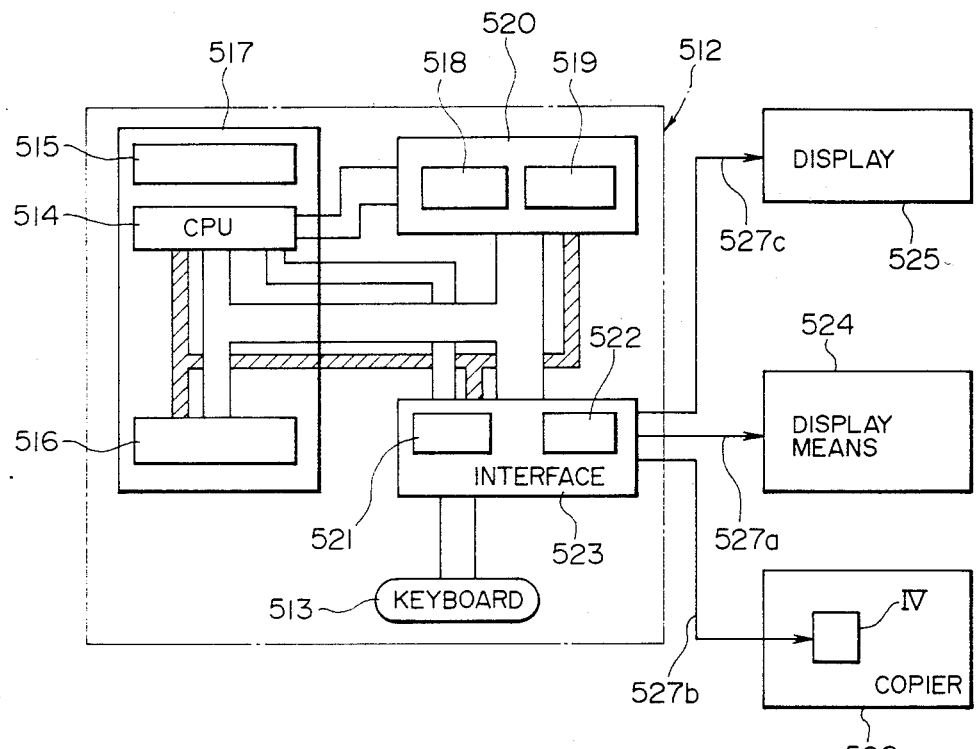
Figures 3, 6:
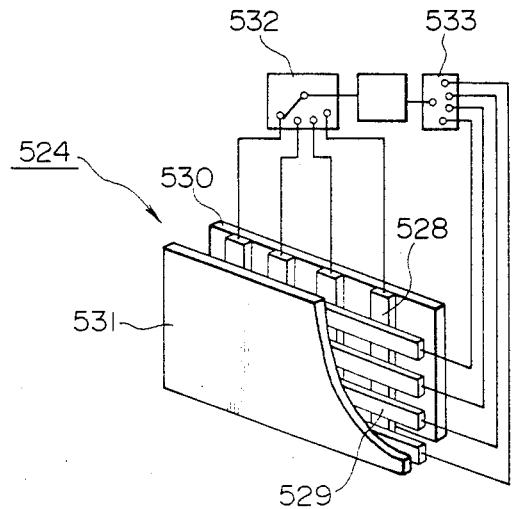

FIG. 6-1 shows a functional arrangement of an image processing apparatus, in which it is constituted by four blocks of an exposing system I, an image creating system II, a paper feeding and carrying system III, and a control system IV.

In copying, the display means attached to the presser plate or an original to be copied which is independently written on an original paper or the like is placed on the original plate glass 4. When the display means or original is lit by the exposing light source of the original illuminating section 50, the reflected light exposes on the light sensitive material 56 through the light pass 57, so that an optical image is formed thereon. The light sensitive material 56 consists of a conductive supporting member, a light conductive layer and an insulative layer. After the light sensitive material 56 was preliminarily uniformly electrified due to the primary corona charge at a latent image forming section 500, it is subjected to the above-mentioned optical image exposure and at the same time it is deelectrified due to the secondary corona charge. Further, the whole surface of the material 56 is evenly exposed by a whole surface exposing lamp, so that an electrostatic latent image is formed in accordance with the optical image. This electrostatic latent image is electrostatically developed by a developer 501 having developing powder (toner) mainly consisting of predetermined charged coloring particles. The image developed is transferred onto a transfer paper which is fed from a cassette 502 through a paper feed controller 503 by use of an electric field due to a transfer electrifier 504. The transfer paper after completion of the transfer is separated from the light sensitive material 56 by a separator 505 and is sent to a fixer 507 by a carrier 506. The transfer paper is subjected to the thermal fixing by a heater H of the fixer 507 and is discharged as a hard copy onto a tray 508. On the other hand, the remaining charged particles on the light sensitive material 56 are removed by a cleaning section 509 and is collected in a toner collecting section 510. The above process is repeated in accordance with the number of copy papers, so that hard copies of a predetermined number are obtained. In addition, a numeral 511 denotes a surface potential controller to control the surface potential on the light sensitive material 56 by controlling the voltages of the developer 501, exposing lamps and each corona electrifier of the electrostatic latent image forming section 500.

The image forming process by the exposing system I, image creating system II and paper feeding and carrying system III mentioned above is sequence controlled by the controller 511 of the control system IV in accordance with a predetermined program. Particularly, the scanning process to illuminate the image by the exposing system I is controlled as follows. Namely, when only an original is copied, in the case where the liquid crystal display panel is provided in a portion of the image region of the original presser plate, the scanning (scan AA) process is executed from the portion which is shifted from the LCD panel. On the other hand, when an image including a liquid crystal display image is copied, the scanning (scan BB) process is executed from the portion which reaches the LCD panel. The scanning process by the exposing system I is selected on the basis of a command signal from the data inputting means to the control system IV.

On the other hand, the number of copy papers and the copy size are also selected by allowing the program stored in the memory to be executed in response to a command signal from the data inputting means.

Figure 2:
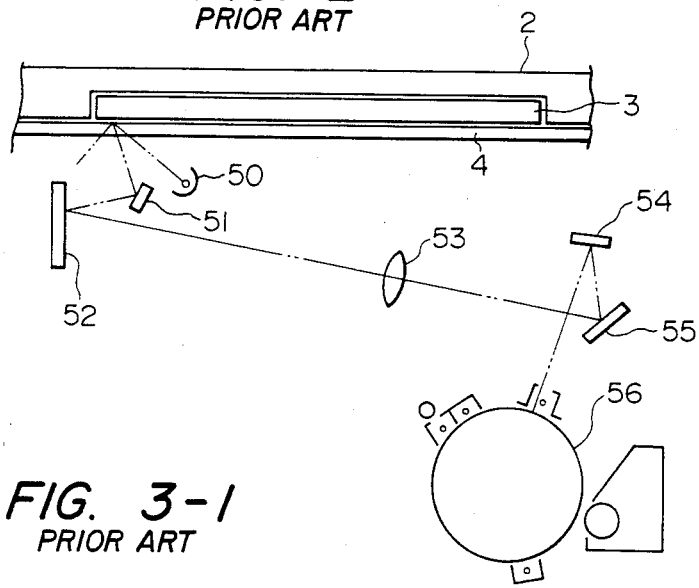
FIG. 2 is an internal arrangement diagram of a copier 1.

FIG. 6-2 is a circuit showing a fundamental system of the image processing apparatus. Data inputting means 512 comprises: a keyboard 513 as operating means; a CPU group 517 consisting of a CPU 514, a clock generator 515 to send a clock signal thereto and a system controller 516; a memory 520 consisting of an ROM 518, an RAM 519 and an external memory and the like if necessary; and an input/output interface 523 having an I/O 521 and an I/O 522. The data inputting means 512 is connected such that its output is input to display means 524, a display 525 and the control system IV of a copier 526, thereby controlling the operation of the system. That is, when a data is input to the data inputting means 512 by operating the keyboard 513, an information signal is output to the display means 524 and display 525 through signal lines 527a and 527c in accordance with the program which has been preliminarily stored in the memory 520. The display 525 assists the data input by the data inputting means. A pattern recognizing apparatus such as an OCR or the like may be provided in place of the keyboard 513. The display means 524 is driven in response to that information signal and displays a predetermined image. If it is necessary to synthesize this display image with the image of the original and record it, this original is placed on the original plate glass of the copier 526 and the presser plate is put down. Next, a synthetic copy command is input to the data inputting means 512. Its signal is output to the control system IV of the copier 526 through a signal line 527b, so that the exposing system I of the copier 526 executes the scanning process by the scan BB mentioned before. Thereafter, a synthetic hard copy is obtained through a predetermined copying process. When only the original is copied, the scanning process of the scan AA by the exposing system I is selected in response to a command from the data inputting means 512 and the copy may be done.

Figures 1, 3:
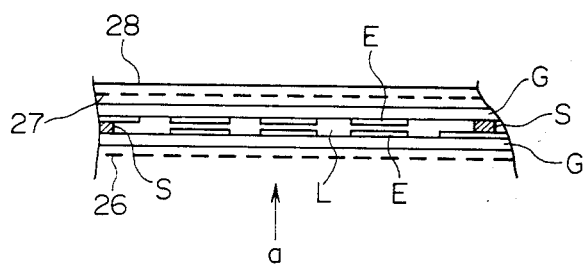
Figures 2, 3:
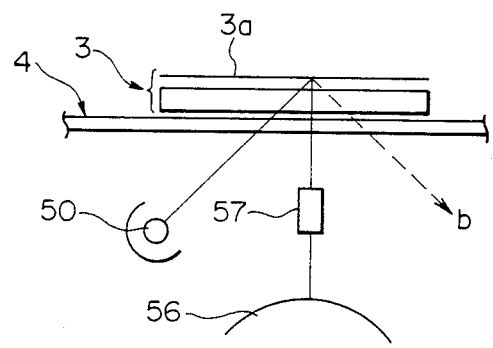

FIG. 6-3 is a diagram illustrating a fundamental arrangement of a liquid crystal display panel as one embodiment of the above-mentioned display means 524. This LCD panel is constituted such that transparent glass supporting members 530 and 531 respectively having electrodes 528 and 529 are disposed to face each other and the gap space therebetween is filled with liquid crystal having a thickness of 5 to 50 $\mu$. As the electrodes 528 and 529, so-called transparent conductive films such as indium oxide, tin oxide or the like are used. However, the electrode surface is preliminarily divided into stripe forms due to the etching or the like and leads are taken out from the respective electrodes divided. The resolution of the image is determined by the pitch of these stripe electrodes 528 and 529 divided. A numeral 532 denotes an X-axis switching circuit for allowing the electrodes 528 to be sequentially scanned, and 533 indicates a Y-axis switching circuit to similarly allow the electrodes 529 to be sequentially scanned. Due to this, a power voltage responsive to the signal from the data inputting means 512 is sequentially applied to each electrode. As a liquid crystal driving method, another method, for instance, a well-known voltage averaging method may be used. The display of the liquid crystal is erased by applying simultaneously a voltage pulse to the pixels.

Figures 1, 7:
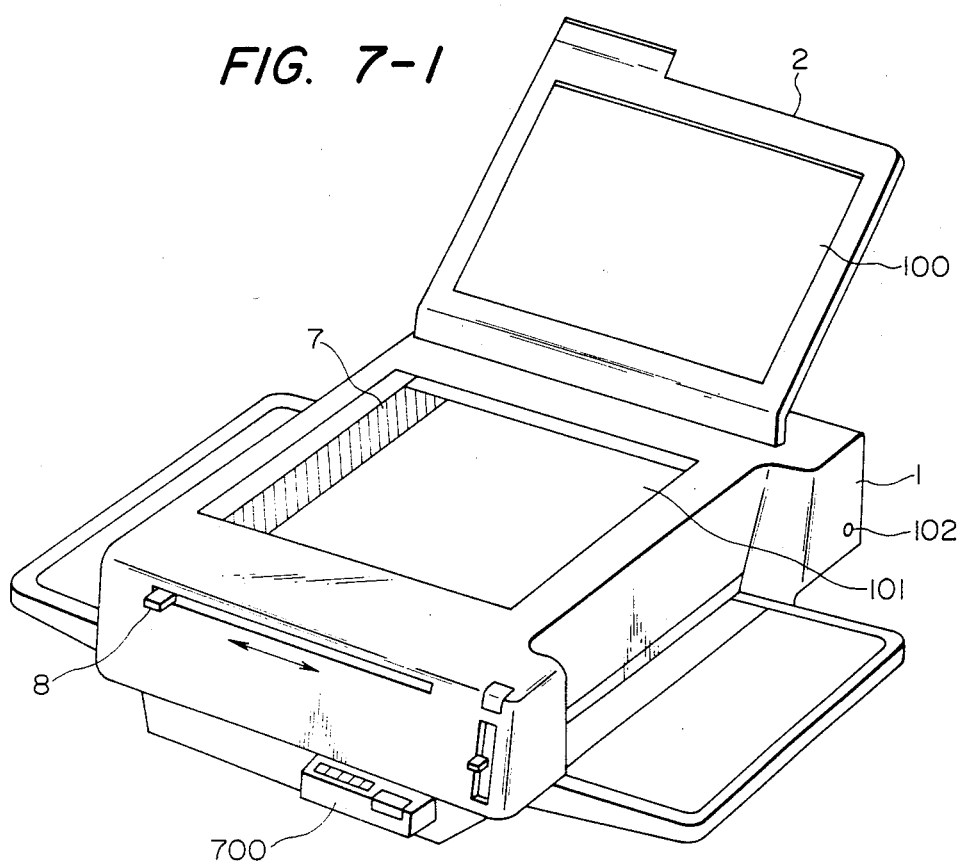
Figures 2, 7:
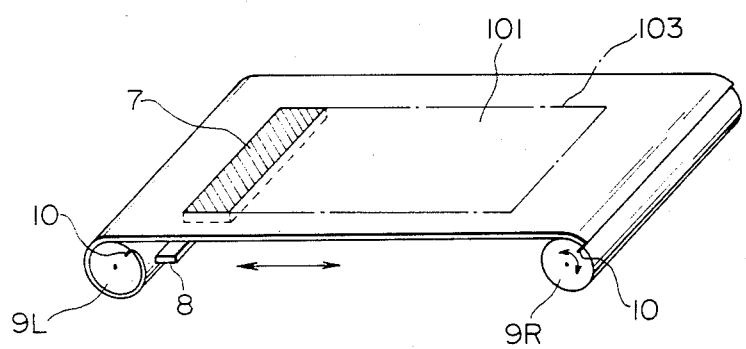

FIG. 7-1 is a perspective view illustrating a copier of the electrophotographic type according to an embodiment of the present invention. A numeral 1 denotes the copier main body of the electrophotographic type similarly to that of FIG. 1; 2 is the original cover on which an original is placed; 100 is an irregular surfaced reflecting plate; 101 an original plate constituted by a transparent film; 7 a reflection type liquid crystal display built in the original plate 101; and 700 a console. This reflection type LCD 7 itself does not have a reflecting plate. A numeral 8 is a knob to move horizontally (in the direction indicated by arrows) the original plate 101 and the reflection type LCD 7 built in the original plate 101; and 102 is a connecting portion with an external apparatus such as a computer or the like.

FIG. 7-2 illustrates an arrangement diagram to explain a principle of movement of the original plate 101 constituted by the transparent film. A longitudinal length of the reflection type LCD 7 is set to be equal to the length of one side of the original placing region built in the original plate 101. However, this LCD does not have a reflecting plate. An original is actually placed in the frame indicated at 103.

Numerals 9L and 9R are rollers to take up the transparent film constituting the original plate 101. By moving the knob 8 in the direction indicated by arrows (i.e., in the lateral direction), the transparent film and LCD 7 are moved in this direction. Also, the transparent film and rollers 9L and 9R are connected by a stopper 10.

For example, an original having the display content as shown in FIG. 8A and in which the area where the simultaneous writing will be done is blank is prepared. The original plate 101 and LCD 7 built in this original plate are moved to the simultaneous writing portion where the content of the original and the display content on the display 7 are written together by the knob 8. Then, characters which the operator wants to write are input to the display 7 from external equipment (e.g., a personal computer with a keyboard, etc). Thereafter, the original is set onto a original plate 101 in the similar manner as the ordinary copying operation and by copying it, a copy as shown in FIG. 8B can be obtained.

As mentioned above, the reflection type LCD is not equipped with a reflecting plate. Namely, in case of simultaneously writing the display content into a part of the original as mentioned above, the blank portion of the original is used as an irregular surfaced reflecting plate of the display 7.

On the other hand, when the copy is performed on a copy paper of a larger paper size than the original, if the display content is written in the blank portion of this copy paper, the simultaneous writing is made possible by use of the irregular surfaced reflecting plate attached to the original cover 2 as the irregular surfaced reflecting plate for the display 7.

In addition, if the surface on the screen of the display 7 is ordinarily constituted as the blank section in this apparatus, the copier 1 can be also used as a copying machine to copy ordinary documents.

The location of the display content in the direction perpendicular to the moving direction (horizontal direction) of the display 7 shown in FIG. 7-2 can be designated by an external apparatus such as, e.g., a personal computer equipped with a keyboard (not shown) or the like connected to the display 7 through a cable or the like. Thus, the horizontal location of the display content is determined by the moving apparatus shown in FIG. 7-2, while the vertical location is determined by an external apparatus.

On one hand, if the operator does not wish to copy a part of the original because of a reason of protection of secret information, by setting the portion on the screen of the display 7 corresponding to that secret portion into the display state (i.e., black indication) and by copying it, it is possible to obtain a copy of which the secret portion was masked.

Although the display can be horizontally moved in the above embodiment, even when the moving apparatus is attached so as to vertically move the display, a similar effect will be obtained. A width of the display may be set to an arbitrary value.

For instance, in the case where the copier 1 is what is called a color copier having three cycles whereby the reflecting light from an original is separated into three primary colors using filters or the like and the development is carried out by use of the toners of the respective complementary colors, if the original is masked using the masking of the original mentioned above only at one cycle among the above-mentioned three cycles, it is possible to obtain a copy of which the masked portion was developed by a color different from that of the original. For example, it is also possible to derive a copy of which the portion where the user wants to emphasize was developed by red, blue or green from the original written by black and white.

Also, in order to easily position the original and display 7, the lighting of the lamp for exposing the original may be on-off controlled irrespective of the image processing.

As described above, according to the present invention, it is possible to provide the image processing apparatus having a plane display in which: this display can be used as an original and can be further moved at an arbitrary location on the original plate; it is possible to obtain a copy of which the display content on the screen of the display was written simultaneously with the content of an original in an arbitrary portion of an ordinary original which is not subjected to any special treatment or in the blank portion of a copy paper; further, it is also possible to obtain a copy of which only that portion was developed by different color; and the above-mentioned operations can be easily performed.

Also, since an ordinary paper as an irregularly surfaced reflecting sheet such as an original or the like can be used as a reflecting plate, an amount of light necessary for processing can be obtained irrespective of the location of the light source, light converging property, etc.

Another embodiment will be further explained. The image processing apparatus which will be described below is constituted such that the above-mentioned original and display are arranged to the original presser plate. Namely, as illustrated in FIG. 9, a numeral 2 denotes the original presser plate and 3 is the plane display. The original presser plate 2 can be rotationally opened and closed in the direction indicated by an double-arrow in the diagram by hinges 2a and 2b. Further, the edge portion near the hinges of the display surface 3 is attached so as to be rotated with respect to the presser plate 2. In addition, a coupling member 104 is pivotally attached to the side edge which is adjacent to the above edge portion coupled by the hinges of that display panel. This coupling member 104 is loosely inserted into a hole 2c formed in the presser plate 2. A stopper portion 104a is formed at the point of the member 104.

With such an arrangement, when an original is put on the original placing section 4, by pressing the original by the original presser plate 2, the copier 1 can be used as an ordinary copying machine. On the other hand, when the original presser plate 2 is opened as shown in the diagram, the upper portion of the display panel 3 is released by only an amount corresponding to the length and location of the coupling member 104 and a gap having a wedge-like cross section is caused. Therefore, by inserting an irregular surfaced reflecting plate, original paper or the like into this gap portion and by getting a hard copy of an output image from a computer or the like which was formed on the display surface by a similar operation as the ordinary copying operation, a hard copy of good quality in which the drawbacks of the conventional technology were eliminated is derived since an amount of mirror reflected light among the reflected lights is less, while an amount of light which reaches the image holding surface through the optical system and contributes to formation of the electrostatic latent image becomes large.

Further, in case of superimposingly copying the original and the display image on the display surface as mentioned above also, by inserting the original into the gap between the original presser plate 2 and the display surface 3 and then by allowing the content of such an original, the content which matches the format, and the image having arrangement to be output on the display surface, and by superimposingly copying them, the simultaneous writing of those information can be performed.

It is also obviously possible to reverse set the arrangements and constitutions of the fixed information and variable information as compared with those mentioned above.

According to the present invention, when it is used as an ordinary copier, it is also possible to copy after inserting the original into the gap between the presser plate 2 and the display surface 3 instead of directly placing the original on the original placing section 4. This makes it possible to prevent that the original is blown out or its location is shifted by a wind pressure when the presser plate is opened and closed.

In the apparatus shown in FIG. 9, the coupling member 104 is used to form the gap between the presser plate 2 and the display surface 3. However, a hook of concave and convex portions may be also formed so that the display surface 3 is always elastically retained to the presser plate 2 using, e.g., a spring, and in case of inserting an irregular surfaced reflecting plate or the like, the gap may be formed by slightly rotating the display surface against the spring force.

With such a constitution, it is possible to avoid the situation such that the irregular surfaced reflecting plate or the like is undesirably shifted particularly in case of a copier of such a type that the original placing section is movable. Also, it is extremely effective when the display surface and original are superimposed and the irregular surfaced reflecting plate is exchangeable, so that the malfunction can be prevented since the operation can be performed while confirming the positional relation between them.

Figure 10:
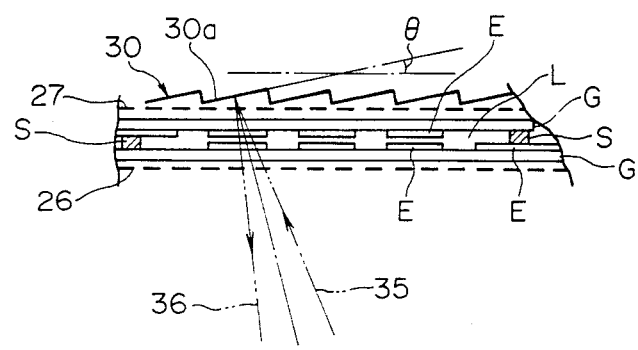
FIG. 10 is a diagram to explain a reflecting plate 30 to which the present invention is applied.

Further, with respect to the drawback such that a sufficient amount of light is difficult to be obtained when the image on the display surface is copied, another embodiment is considered. Namely, for example, in the structure shown in FIG. 9, the display 3 is constructed as shown in FIG. 10. However, even when the reflecting plate 30 at the back side of the liquid crystal cells is merely constituted as the fine saw-tooth-like slant surface as illustrated in FIG. 10, although it is possible to constitute such that the direction of a mirror reflected light 36 of a flux of light 35 radiated from a light source in the copier substantially coincides with the direction of the reflected light which is projected onto the mirror 51 shown in FIG. 2, the arrangement and relation between the light source 50 and the mirror 51 in the copier shown in FIG. 2, namely, all values of incident angles and reflection angles in different types of copiers are not always identical. Thus, only with such an arrangement as shown in FIG. 10, in the case where the above-mentioned angular relation differs, this arrangement is substantially equivalent to the case of the plane reflecting plate 28 shown in FIG. 3-1 mentioned before, so that a clear copy cannot be obtained. Also, the description of the portions similar to those shown in FIG. 3-1 will be omitted here.

As a result, in the structure shown in FIG. 9, the display 3 has such a structure as shown in FIG. 10. In other words, even when there is a difference between the direction of the projected light 35 from the exposing light source and the direction of the reflected light 36 which is radiated onto the mirror depending upon the copier, by changing an angle $\theta$ between a slant surface 30a of the reflecting plate 30 and the horizontal surface, the reflected light from flux 36 can be oriented into a desired direction.

In addition, by opening the original presser plate 2 and releasing the hook (concave and convex portions, not shown), the gap is formed between the plate 2 and the display 3 as shown in FIG. 9. A reflecting plate is prepared which is provided with the saw-tooth-like reflecting surface having such an angle $\theta$ (FIG. 10) as to meet the relation in the reflected light path of the light source of the copier. Then, by inserting and setting such a reflecting plate into the above gap, it is possible to use the optimum image which is suitable for the copier having various positional relations between the light source and the light path for the manufacturing of a hard copy. Thus, a clear copy with large contrast is obtained. On the other hand, in the case where an original to be copied is inserted into the above gap and the copying operation is done while the LCD panel is set to the blank, the original is prevented from being undesirably moved when the original presser plate is opened and closed; therefore, this constitution is advantageous. Also, the miscopy can be prevented since each location of a surface which is copied can be preliminarily observed and checked.

Figure 11:
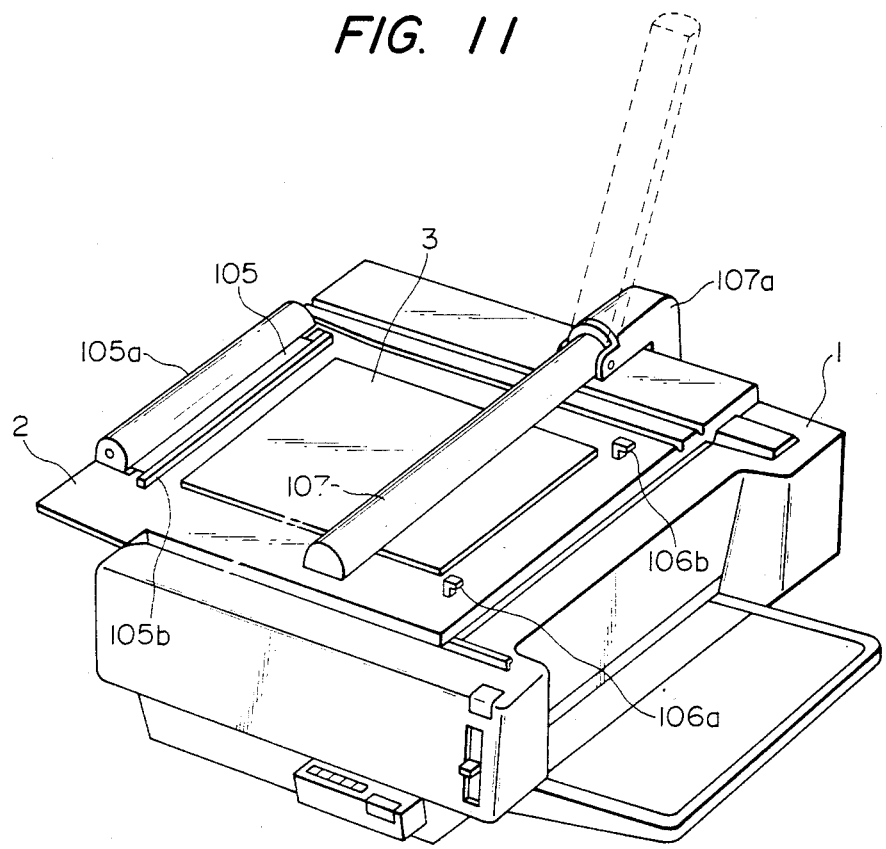
FIG. 11 as a perspective view of an image processing apparatus to which the present invention is applied.

Next, another embodiment to obtain a clear hard copy of the display screen mentioned above will be shown. FIG. 11 is a perspective view illustrating an image processing apparatus to which the present invention is applied.

A cover 105a is attached to the outer surface of the original presser plate 2 at the location near one side edge thereof. A soft, flexible, sheet-like reflecting material 105 is wound inside the cover 105a. This reflecting material 105 is always oriented in the winding direction by a spring or the like (not shown). A holding rod 105b is attached to the outer end of the reflecting material 105. This prevents the reflecting material 105 from being wholly wound inside the cover 105a and allows the reflecting material to be freely released and taken out from the cover 105a by pulling out the reflecting material with the holding rod 105b gripped.

In addition, stopping members 106a and 106b are attached to the opposite ends at the edge portion on the outer surface of the original presser plate 2 where the reflecting material 105 is arranged. Therefore, by pulling out the holding rod 105b against the action of a spring or the like (not shown), the reflecting material 105 is pulled out. Then, by fixing the holding rod 105b to the stopping members 106a and 106b, the stretched reflecting material 105 is maintained at that location so as to cover the LCD panel 3.

Further, a supporting block 107a is attached to the side portion of the copier main body. One end of the block 107a is arranged to a top face of the copier and a light source 107 such as a fluorescent lamp, halogen lamp, etc. is rotatably attached to this portion. The light source 107 is preferably positioned such that the circular light source of the copier which opens toward the original placing section 4 on the top face of the copier radiates the light onto the original and that it faces an exposing slit 4a through which the reflected light is projected to the lens system in the copier.

With such an arrangement, to observe an output image on the liquid crystal display surface by a computer or the like, the light source 107 is rotated at the location indicated by the broken line shown in FIG. 11 and the original presser plate 2 is held at the opened leading location, then the reflecting material 105 is pulled out, thereby constituting the liquid crystal cells as the reflection type liquid crystal cells, so that the image thereof can be seen.

When copying this image, after the reflecting material was enclosed in the cover 105a, the light source 107 is put down as shown in FIG. 11 to cover the exposing slit and the image on the display surface is formed on the surface of the image holding material in the copier from the slit through the LCD surface.

In addition, it is convenient that a microswitch or the like is equipped in the supporting block 107a, thereby sensing the putting down of the light source 107 and that the switching on and off of the light source in the copier is controlled in accordance with the position of the light source. When the light source 107 is put up and an original is placed on the original placing section and the copier is made operative, a hard copy can be obviously obtained similarly to the case of a well known copier.

Figure 12:
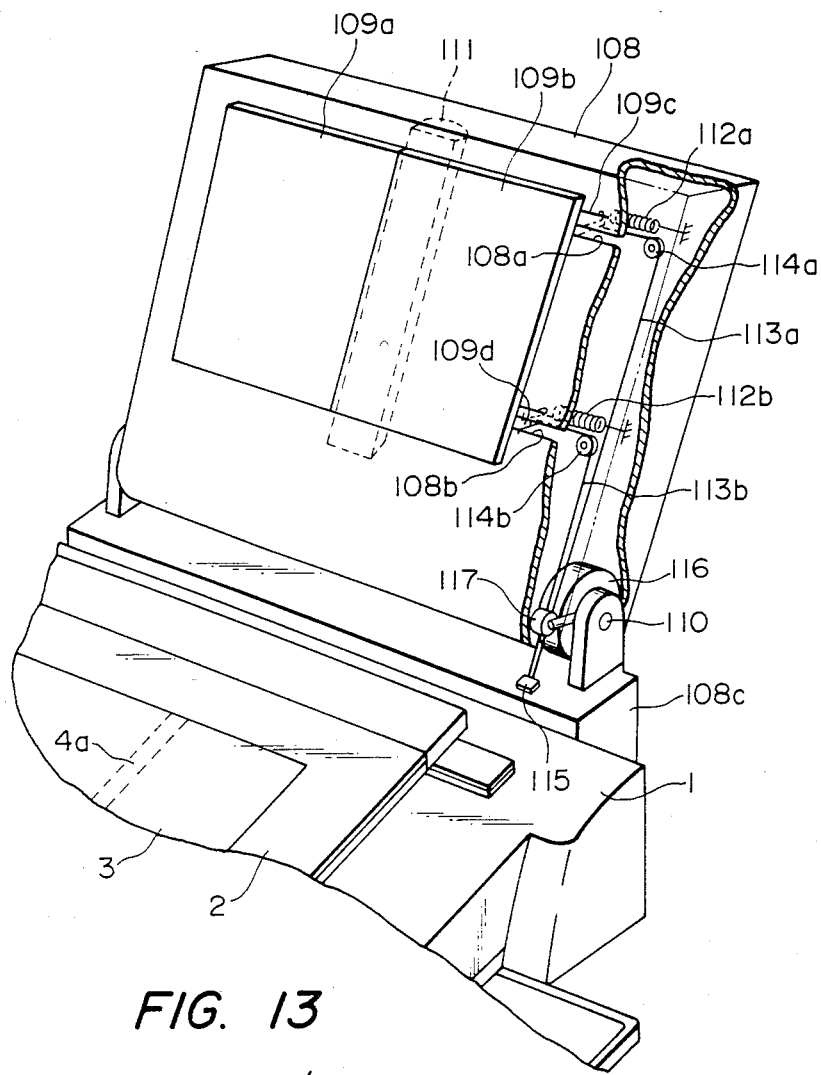
FIG. 12 is a diagram to explain the original presser plate having an illuminating mechanism.

FIG. 12 illustrates further another embodiment of the present invention. The original presser plate 2 equipped with the transmission type LCD panel 3 is closably arranged on the top face of the copier main body 1 in the similar manner as that mentioned before. A supporting block 108c is fixed to the side portion of the copier main body on the side of the opening/closing rotational central line of the presser plate. This supporting block 108c is provided with an illumination mechanism 108. Both sides thereof are pivotally attached to the block 108c by pins 110 (only one of them is shown in the diagram). A fixed reflecting plate 109a and a movable reflecting plate 109b are arranged to the illumination mechanism 108 at the inner surface thereof, namely, at the surface on the side which overlappingly face the presser plate 2 when the illumination mechanism is rotationally closed. These reflecting plates can be come into close contact with the back side of the LCD panel 3 arranged to the presser plate 2 when the illuminating mechanism 108 is closed.

At least one (two, in this embodiment shown in the diagram) projecting portions 109c and 109d are formed at the back side of the movable reflecting plate 109b. These projecting portions are slidably inserted into slits 108a and 108b formed in the surface of the illumination mechanism main body, respectively. In addition, each one end of presser springs 112a and 112b is fixed to a proper location in the illumination mechanism main body, respectively, while the other ends thereof abut on the projections 109c and 109d. These springs push the movable reflecting plate 109b to the left in the diagram through the respective projections 109c and 109d, thereby causing the plate 109b to abut on one edge on the right side of the fixed reflecting plate 109a.

Further, each one end of wires 113a and 113b are fixed to each of the above projections. These wires extend by being suspended by rollers 114a and 114b attached to the illumination mechanism main body, respectively, while each of the other ends is fixed to a wire stopper 115 formed on the supporting block 108c.

Figure 13:
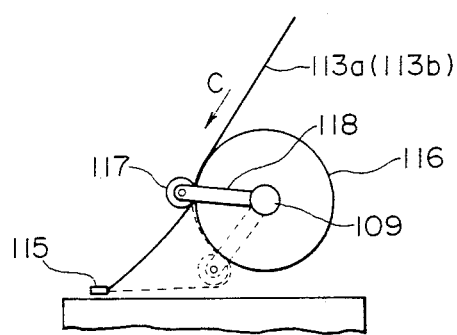
FIG. 13 is a diagram to explain the motion of the wire.

As explained above, the illumination mechanism 108 is rotatably opened and closed around the pins 110 disposed on the side of the supporting block as rotational centers. On the other hand, a large roller 116 is attached to the pin 110 as shown in FIG. 13. Further, a small roller 117 is arranged to the free end of an arm 118 which is rotated in association with the opening/closing rotation of the illumination mechanism 108 in the contact relation with the outer periphery of the roller 116.

With such an arrangement, since the reflecting plates 109a and 109b are formed on one surface of the illumination mechanism in the state shown in FIG. 12, when the original presser plate 2 is opened, the LCD panel 3 attached thereto is overlapped with the reflecting plates 190a and 190b. Thus, the image on this LCD panel can be observed with high contrast in the similar manner as that on the reflection type LCD panel.

In addition, to obtain a hard copy using this output image as it is as an original, the LCD panel is overlapped on the original placing section of the copier main body as shown in FIG. 12 and the illumination mechanism 108 is further rotationally closed around the pins 110 as rotational centers. Thus, it can be understood from FIG. 13 that the wires 113a and 113b sandwiched between the rollers 116 and 117 are bent along the outer periphery of the roller 116 as indicated by the broken line in the diagram since the arm 118 is also simultaneously rotated from the simultaneous location indicated by the solid line to the location indicated by the dotted line, so that the wires are wholly pulled out in the direction indicated by an arrow C.

As the wires 113a and 113b are pulled out, the movable reflecting plate 109b is moved by an appropriate distance to the right in FIG. 12 against the actions of the springs 112a and 112b. Thus, the light emitted from a light source 111 arranged on the back side of the reflecting plate passes through the LCD panel from the gap between the reflecting plates 109a and 109b and enters the exposing slit 4a of the copier main body. Next, it passes through a lens system (not shown) and the image on the liquid crystal surface can be formed on a light conductive layer (not shown).

As described above, according to the present invention, in the image processing apparatus such as a copier or the like, the transmission type LCD panel is arranged on the original presser plate and the reflecting plates are formed at the locations corresponding to its display surface, thereby obtaining contrast of the order necessary for observation, and at the same time the light source is used so that a necessary light amount and contrast are derived when a hard copy is obtained from the LCD panel. Therefore, there is no need to modify the design of the copier main body side and an image of necessary contrast and a clear hard copy can be always obtained in accordance with the case of observing the output image of the LCD panel and the case of obtaining a hard copy. On the other hand, upon observation of the output image of the LCD panel, since an extent in that a contrast of the image can be assured in dependence upon adaptability of the eyes of the observer is large, the light source is not lit up in this case, so that this contributes to reduction in running cost of the apparatus.

Figure 14:
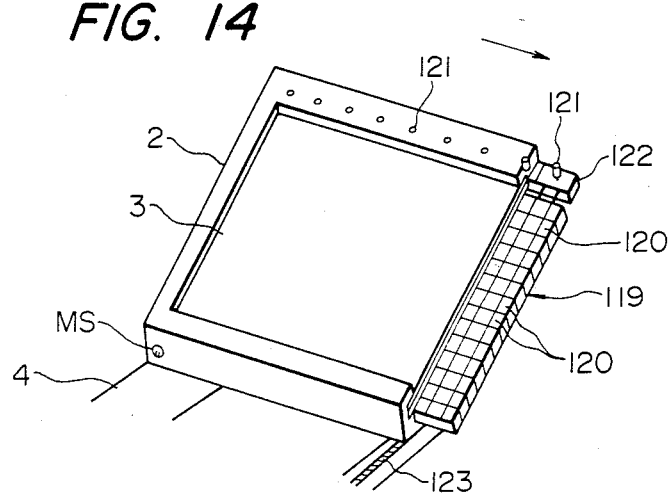
FIG. 14 is a partial cross section view of an original presser plate 2.

Next, the image processing apparatus will be explained whereby in order to obtain a clear copy of the image on the display panel, the transmission type LCD panel 3 is attached inside the original presser plate 2 and a light emitting member is arranged at the back side of the display panel as will be described below. FIG. 14 illustrates a partial cross sectional view of the original presser plate 2. In the diagram, a reference numeral 119 denotes a light emitting member in which a number of light emitting elements 120 are arranged and formed; 121 shows photo sensing elements; and 122 is a control member which receives signals from these photo sensing elements and controls the lighting on and off of the light emitting member 119. Also, MS is a microswitch and 123 is a signal line. The whole apparatus is constituted such that a lamp for lighting the liquid crystal is provided for the display means 524 in FIG. 6-2.

Figures 1, 15:
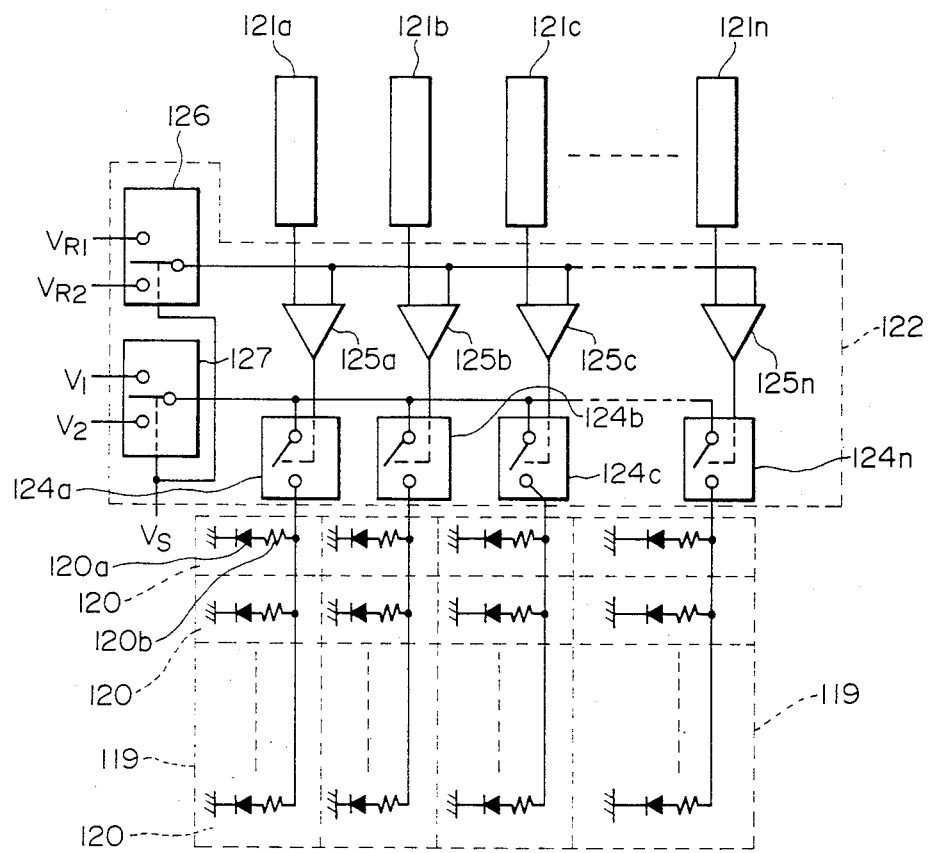

FIG. 15-1 shows the light emitting member 119 shown in FIG. 14 and a drive circuit to drive it. As schematically shown in FIG. 15-1, the light emitting member 119 is constituted such that a number of light emitting elements 120 each of which consists of a light emitting diode 120a and a current limiting resistor 120b are arranged longitudinally and laterally so that they are distributed on the whole back surface of the LCD panel 3. Each column of the light emitting elements (a group of a plurality of such elements arranged vertically in the diagram) is connected to switching elements 124a, 124b, 124c, . . . , 124n, respectively. Each of these element columns corresponds to the slit 4a for lighting the original in the copier. Photo sensing elements 121a, 121b, . . . , 121n are arranged to the slit 4a in the direction perpendicular thereto. Output ends of those respective elements are connected to comparators 125a, 125b, 125c, . . . , 125n. Output terminals of the respective comparators are connected to the respective switching elements 124a, 124b, . . . , 124n. $V_s$ is a signal representing that the LCD panel is in the state whereby it can be observed (FIG. 14) or it is in the state whereby it covers the upper surface of the copier to copy. For example, this signal $V_s$ is obtained by providing the microswitch MS in the original presser plate 2 and by opening and closing the switch MS in accordance with the opening and closure of the original presser plate.

Switches 126 and 127 switch the applied voltages in response to the signal $V_s$. Namely, when the signal $V_s$ indicates that the LCD panel is at the location where it is observed, a voltage $V_{R1}$ is supplied as a reference signal to each comparator 125a, . . . by the switch 126, while a voltage $V_1$ is applied to an input end of each switching element 125a, . . . by the switch 127. At this time, if $V_{R1}$ has been set to be small enough, the switching elements 124a, . . . are turned on in response to outputs of the comparators 125a . . . irrespective of outputs of the photo sensing elements 121a. Therefore, the diodes of the light emitting member 119 all emit the lights, thereby illuminating the whole surface of the LCD panel 3.

In the case where the LCD panel 3 is put down on the original placing section 4 of the copier and the apparatus is in state whereby the copy is possible, the signal $V_s$ becomes a value indicating that the apparatus is in the copy mode. At this time, a reference voltage $V_{R2}$ is applied to the comparators 125a, . . . through the switching element 126, while the voltage $V_2$ is applied to the switching elements 124a, . . . through the switch 127. When the copying operation of the copier is started, the original placing section including the LCD panel is moved in the direction indicated by an arrow of FIG. 14, then a light source for exposure (not shown) in the copier is lit and the display panel 3 is illuminated. In this state, it is moved in the direction opposite to the arrow and the copy is done. In this case, only the portion corresponding to the slit 4a in the liquid crystal surface is illuminated, so that one light emitting element group in the light emitting member 119 (one group in the vertical direction shown in FIG. 15-1) is illuminated. At the same time, one of the photo sensing elements 121a, . . . , 121n corresponding to it receives the light. Due to this, a high-level signal is input to one of the comparators from the photo sensing elements. Since the reference signal is $V_{R2}$ at this time, when a signal at a level higher than that is applied, the corresponding switch is made operative, thereby allowing the voltage $V_2$ to be applied to only the light emitting element group corresponding to the slit 4a. Namely, only the portion which is copied in the LCD panel is illuminated by the light emitting elements and only this portion becomes an image of high contrast and is copied in the wellknown manner.

As described above, when optically reading and processing the image displayed on the transmission type LCD panel in the manner as in the copier, only the necessary light emitting elements among them arranged at the back side of the LCD panel are sequentially illuminated, thereby enlarging the contrast of the image. Therefore, even if the voltage $V_2$ is enlarged to increase the brightness of the light emitting diode, its lighting time is short, so that even when the light emitting elements are driven by a large current, deterioration in service life thereof can be suppressed. In case of merely observing the image, all of the light emitting elements can be used at a relatively low brightness. This makes it possible to reduce the energy consumption and to obtain a clear hard copy by the high-contrast image due to radiation at high brightness.

On one hand, the LCD lighting lamp 119, when copying, can be illuminated in response to the copy command signal from the data inputting means 512, but it may also be automatically illuminated.

An example of an additional circuit in such a case is shown in FIG. 15-2. A photoelectric converting element (e.g., photo transistor) 534 is provided in the presser plate 2. When the LCD image is copied, the presser plate 2 is put down on the original plate glass 4. When the element 534 senses the light of the exposing lamp in the copier 1 in this state, it outputs an electric signal. This output signal is sent through a buffer 535 to the data inputting means 512, from which a lighting command for the LCD lighting lamp 119 is output.

In addition, the exposing lamp lighting signal of the copier 1, for instance, may be sent directly to the data inputting means 512 without being transmitted through the photoelectric converting element 534 and the lighting command for the LCD lighting lamp 119 may be output.

Also, it is possible to sensing a displacement of the original plate such as the putting down of the original plate or the like by use of the microswitch MS in FIG. 14, thereby to use this detection signal as the copy start command. This enables the copy to be rapidly performed without waiting for the leading time for warmup the apparatus. In case of the above-mentioned transmission type LCD as well, a switch which commonly senses the lighting command of the LCD lighting lamp 119 and the copy start command or exposing lamp on command may be used.

Figure 4:
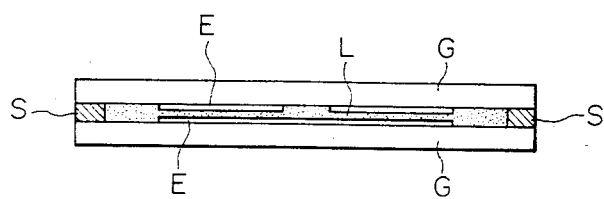
FIG. 4 is an arrangement diagram of an LCD.

Next, the case will be explained where the optical system in the copier is arranged at the location where the contrast becomes maximum to obtain a clear hard copy of the display image. Namely, the optical system is arranged at the location where the maximum contrast is obtained as described in FIGS. 5-1 to 5-4. FIG. 16 is an arrangement diagram of the image processing system of the image processing apparatus of the present invention, in which the same parts and components as those shown in FIG. 3-2 are designated by the same reference numerals.

Figures 1, 5:
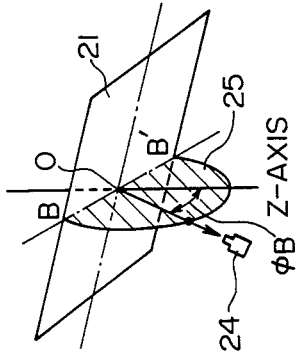
Figures 3, 5:
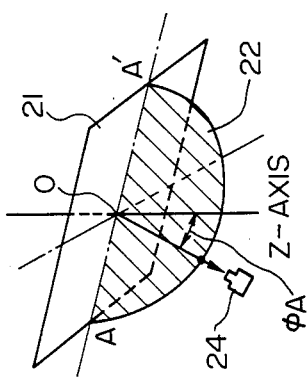
Figures 2, 5:
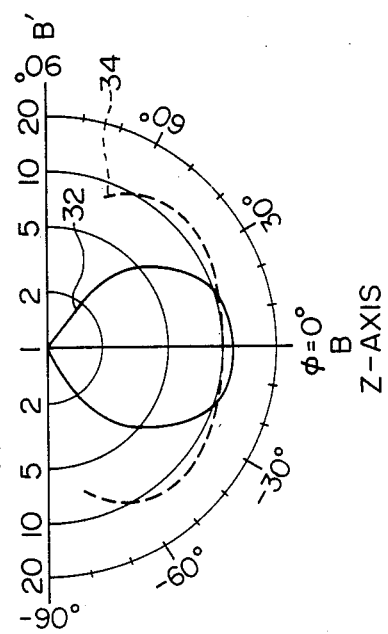
Figures 4, 5:
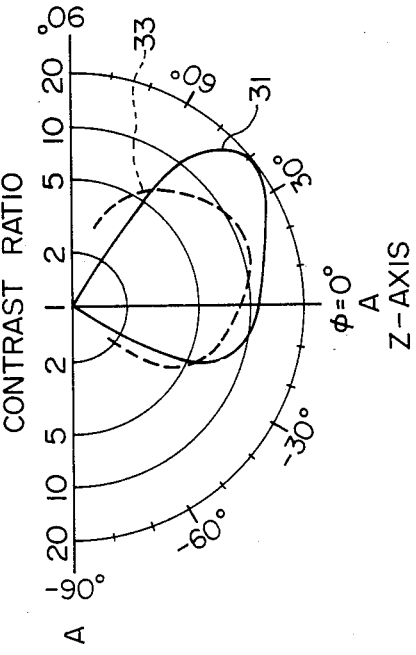

The location at the maximum contrast in FIG. 16 is determined such that an angle $\phi'$ from an axis 127 is 25° to 50° as can be seen from the graph (indicated by the solid line) in FIG. 5-2. By directing the reflected light in this direction by the lens system 57, a good copy having a contrast ratio of 15 to 20 can be obtained.

On one hand, in case of using the GH type liquid crystal cells, it can be similarly appreciated from the graph (broken line) in FIG. 5-2 that a good contrast ratio is obtained when it is determined that $\phi' = 10°$ to 30°.

In FIG. 16, assuming that a point B is the left side, a point B' is the right side, a point A' is the front side of the paper, and a point A is the back side of the paper, or assuming that the respective points A, A', B, and B', are set conversely as the above, it can be seen that a good contrast ratio is derived when $\phi' = 20°$ to $50°$.

As described above, when obtaining a hard copy using the image on the LCD panel as the original of the image processing apparatus such as a copier or the like, the light path for optically reading the image of the image processing apparatus is arranged so as to match the visual dependability of the image on the LCD panel. Therefore, an adequate amount of light from the light source can be used to form the latent image, thereby enabling a clear hard copy to be derived.

Next, FIG. 17 illustrates an embodiment of the present invention with respect to an angle of the original cover 2 in case of observing the display panel in consideration of the above contrast.

Similarly to the apparatus shown in FIG. 1, the LCD panel 3 is attached inside the original presser plate 2 of the copier 1. This panel 3 is functionally coupled to the computer 5 by the cable 6. An output of the computer is displayed on the display panel and the output image can be observed at the location as shown in FIG. 17. Also, this image is used as an original and a hard copy can be obtained quickly.

In the present invention with such an arrangement, in order to cope with the visual dependability of the LCD panel as mentioned above, the original presser plate 2 in which the display panel 3 is attached can be maintained in the semifixed state at the location where an opening angle between the presser plate 2 and the original placing section 4 are variously changed. Particularly, the deflecting property of the contrast ratio as explained in FIGS. 5-2 and 5-3 is compensated, thereby enabling the output image in good condition to be observed.

The original presser plate 2 is coupled to the copier main body through the hinges and means for semi-fixing the presser plate according to the present invention is arranged on the side where the hinges exist. This constitution will be described hereinbelow in conjunction with FIGS. 18 and 19.

Figure 18:
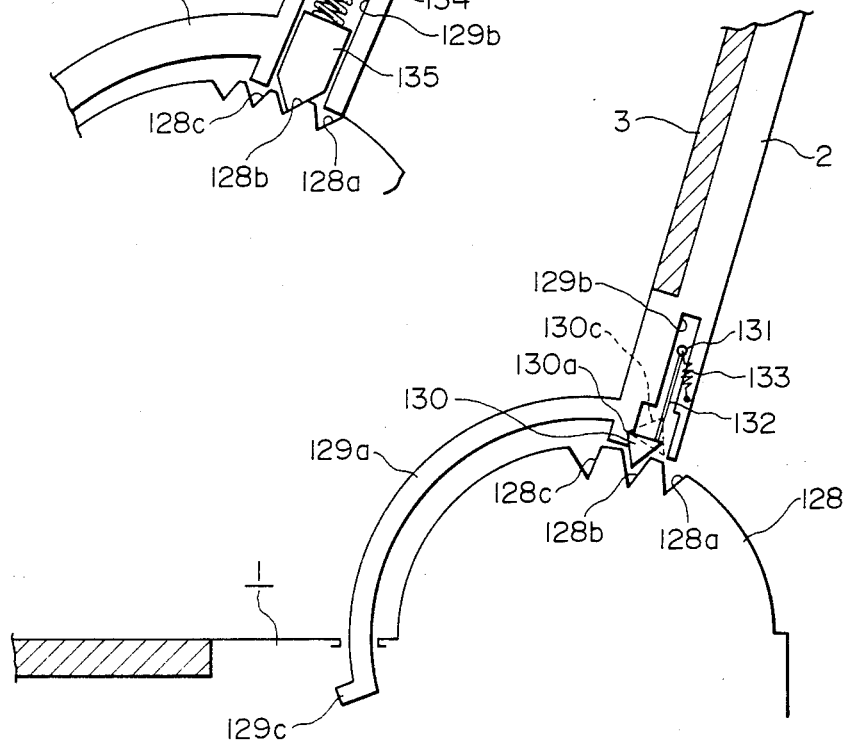
FIG. 18 is a diagram to explain the portion to hold the original cover.

FIG. 18 shows an embodiment of the invention and is an enlarged side elevational view showing the portion in the range surrounded by the alternate long and short dash line EN in FIG. 17.

A convex-shaped angle adjusting member 128 is integrally formed at least at one edge portion on the side where the original presser plate 2 equipped with the LCD panel 3 which is closably connected to the copier main body 1 is connected to the main body. A plurality of (three, in the embodiment of FIG. 18) grooves 128a, 128b and 128c are formed in proper locations around the outer periphery of the member 128.

A long groove 129b is formed in the edge portion of the original presser plate 2 on the side near the copier main body. An engaging member 130 is arranged near the opening portion at the lower end of this long groove so as to freely swing. This engaging member 130 has nearly a triangular cross section in the side elevational view and is pivotally attached (130a) to a proper location in the above long groove at the location of one vertex among those three vertexes.

An operating rod 131 is slidably attached in the long groove 129b. The point of a rod 132 attached to this operating rod is connected to the engaging member 130 and is further come into pressure contact therewith under the action of a spring 133, thereby allowing the engaging member 130 to be rotated into the location indicated by the solid line in the diagram. Thus, the engaging member 130 engages either one of the grooves 128a-128c of the angle adjusting member 128, thereby semi-fixing the presser plate 2 and display panel 3 into the respective corresponding locations. As shown in FIG. 17, the operating rod 131 protrudes to the side of the presser plate 2 and the operator can operate it. Therefore, in the case where the engaging member 130 is inserted in the groove 128b, for instance, as shown in FIG. 17, to further rotate the presser plate 2 clockwise, the operating rod 131 is pulled up and the engaging member 130 is rotated to the location indicated by the dotted line in FIG. 18, thereby disengaging the engaging member and groove and rotating the presser plate. Thereafter, the engaging member may be inserted in another groove.

On the other hand, to rotate the presser plate 2 counterclockwise in FIG. 18, by rotating the presser plate in this state, the engaging member 130 is rotated in the direction of the dotted line 130c in the diagram against the action of the spring 133 and is removed from the groove of the angle adjusting member, so that it can be freely rotated.

A bent portion 129c is formed at the point of the portion indicated at a numeral 129a in FIG. 18. When the presser plate 2 is rotated clockwise, this bent portion is stopped at a proper location of the main body 1 and serves as a stopper to obstruct the further rotation of the presser plate 2.

Figure 19:
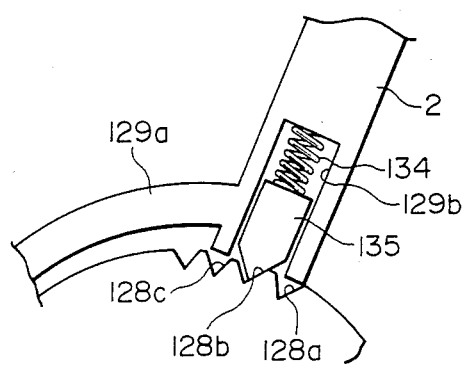
FIG. 19 is a diagram to explain another embodiment of the portion to hold the original cover.

FIG. 19 shows another embodiment of the invention and illustrates a similar portion as that in FIG. 18. In FIG. 19, the parts and components as those shown in FIG. 18 are designated by the same reference numerals.

As can be seen from the diagram, an engaging member 135 is attached in the long groove 129b and this engaging member 135 tends to project outwardly by the action of a spring 134. The projecting portion at the point of the member 135 is inserted in either one of the grooves 128a, 128b, . . . formed in the angle adjusting member 128, thereby holding the presser plate 2 into the location corresponding to the groove.

When rotating the presser plate 2 clockwise or counterclockwise in the diagram, the engaging member 135 is removed from the groove 128a or the like against the action of the spring 134 and is again inserted in the groove at the location corresponding to the rotational angle of the presser plate 2, thereby holding the presser plate into that location. This constitution may be adopted in the case where the rotational portion including the presser plate 2, display panel 3, etc. is relatively light-weighted.

The present invention has a constitution as described above. Therefore, by making the angle adjusting direction of the presser plate 2 in which the LCD panel is attached coincident with the direction having large visual dependability of the LCD panel as mentioned before, the operator can always observe a clear image at the location where a contrast ratio is largest. Also, this makes it possible to provide the image processing apparatus in which the operation is easy and fatigue is reduced.

Figure 20:
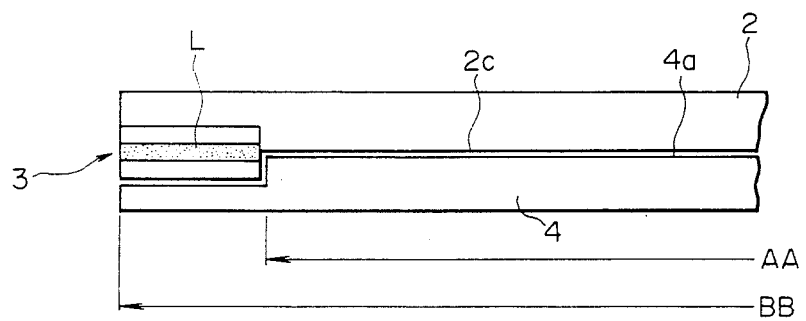
FIG. 20 is an arrangement diagram of the original cover in which a liquid crystal section and an original cover surface are set to the same level.

Next, an image processing apparatus will be explained which can obtain a very clear image by merely selecting simultaneously both a display image of the display means and an image of an original or by selecting either of them. To make the image of the original and the processing image of the display image clear, the image exposing locations of both of them are set into the same level in this embodiment. Namely, as shown in FIG. 20, a different level portion is provided in a portion of the presser plate 2 and the display section 3 is attached on this different level portion such that the level of the liquid crystal section L serving as the image forming section is substantially identical to the level of the surface of the original placed on an upper surface 4a of the original plate glass 4. On the other hand, a corresponding different level portion is also formed in the original plate glass 4, thereby enabling the portion projected from a pressed surface 2c of the presser plate 2 in the display means 3 to be enclosed in that different level portion. In addition, the descriptions regarding the scan AA and scan BB will be omitted since they are identical to the description in FIG. 6-1. In this way, the display image of the display means and the image of the original can be simultaneously or selectively recorded clearly by merely selecting the scanning range of the exposing system.

Figure 21:
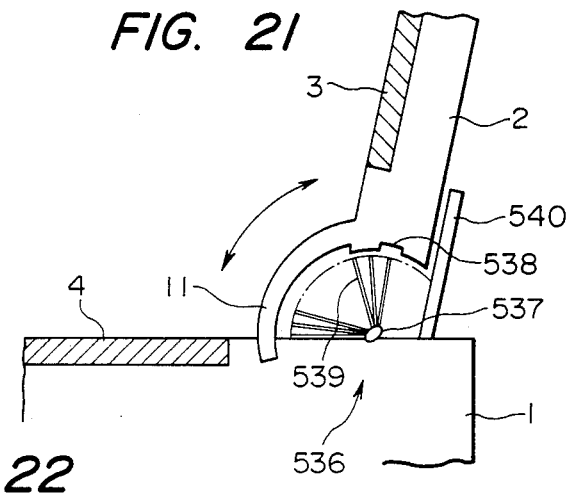
FIG. 21 is a diagram to explain the original cover having an optical signal coupling section.

Next, the case will be explained where the transmission of complicated signals according to the image processing is performed by photo signals. FIG. 21 is a constitutional diagram of a photo signal coupling section 536. A numeral 537 is a light emitting element which generates a photo signal; 538 is a photo sensing element which receives this signal; 539 indicates optical fibers to transmit the photo signal from the light emitting element 537 to the photo sensing element 538; and 540 is a stopper for the LCD cover 2. The grooves for fine adjustment, for example, as explained in FIGS. 18 and 19 are formed in the LCD cover 2 so that the angle between the LCD cover and the original plate glass 4 can be finely adjusted when the cover is opened. The LCD cover is fixed by the stopper 540.

The optical fibers 539 are attached like a fan as shown in the diagram within an angular range of fine adjustment when the LCD cover 2 is open and within a range of vertical movable width of the cover depending upon a thickness of original when the cover is closed, e.g., when an ordinary original and the display panel 3 are simultaneously copied. Within the above angle and movable width, the optical signal from the light emitting element 537 is certainly transmitted to the photo sensing element 538.

With such an arrangement, the signal from the light emitting element 537 in the copier 1 is connected to the LCD cover 2 without a cord, thereby eliminating the mechanical burden for the signal connecting section in association with the opening and closure of the cover 2 as mentioned before, so that the signal can be surely connected.

Figure 22:
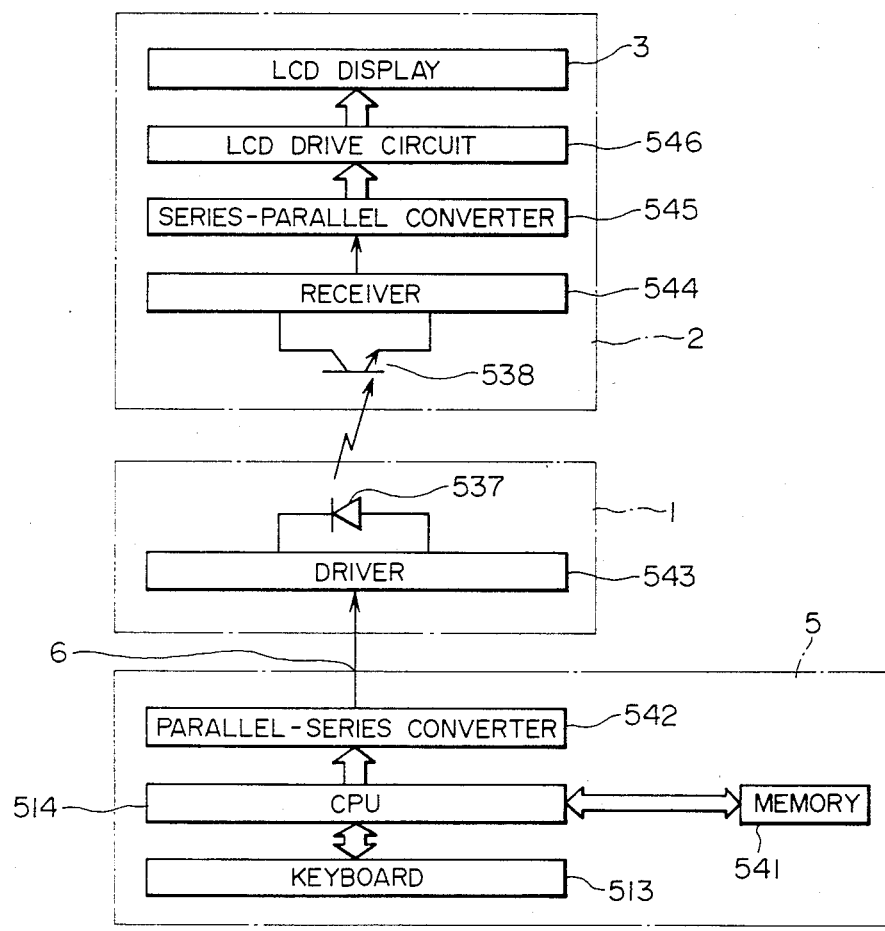
FIG. 22 is a block diagram of the image processing apparatus having the optical signal coupling section.

FIG. 22 is a block diagram of the present invention. The personal computer 5 consists of the CPU 514, the keyboard 513, a memory 541, and a parallel-series converter 542. Several parallel signals from the CPU to the LCD cover 2 are converted to the serial signal by the above parallel-series converter and are transmitted through the cable 6 to a driver 543 of the light emitting element 537 in the copier 1 and are converted to the photo signal. This signal is received by the photo sensing element 538 and a receiver 544 in the LCD cover 2 and is converted to the parallel signal by a series-parallel converter 545. Namely, it is converted to the original signal and is transmitted to an LCD drive circuit 546, thereby driving the LCD panel 3.

As described above, in this apparatus, the signal connecting section which have conventionally used a number of signal lines for signal connection thereof can be constituted by a pair of optical elements. Moreover, the signal can be always certainly transmitted since no burden is made for the signal connecting section when the LCD cover is opened and closed.

In addition, although the display panel 3 can be adjusted to the angle at which it can be easily seen when the LCD cover 2 is opened, it is constituted such that the photo signal can be surely connected within a range of this angle.

Figure 23:
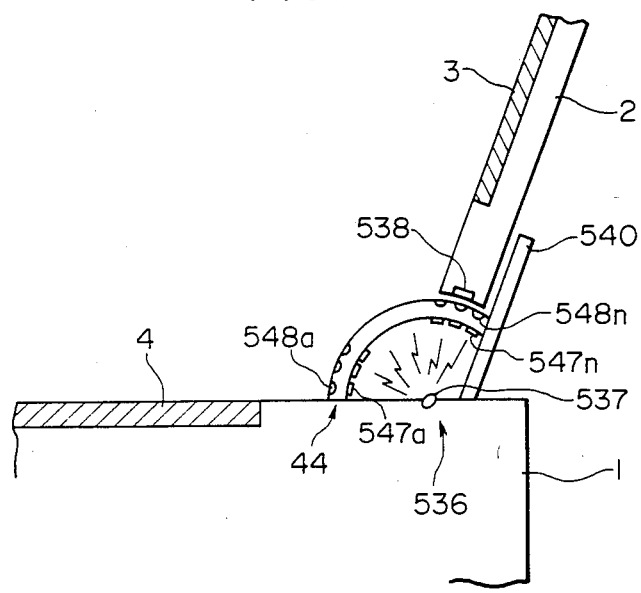
FIG. 23 is a diagram to explain another embodiment of the image processing apparatus having the optical signal coupling section.

On one hand, FIG. 23 shows a structure of another embodiment of the present invention, in which the same and corresponding parts and components as those shown in FIG. 21 are designated by the same reference numerals.

Figure 24:
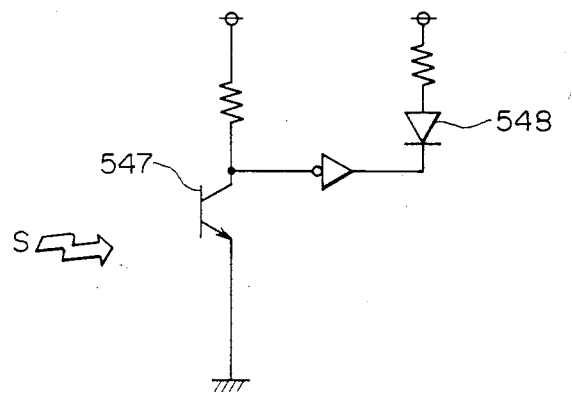
FIG. 24 is a diagram to explain a light emitting element and a photo sensing element which are used in the optical signal coupling section.

As the photo sensing element to receive the photo signal from the light emitting element 537 which generates the photo signal, a plurality of such photo sensing elements (547a to 547n) are arranged at the locations opposite to the light emitting element 537 as shown in the diagram. As shown in FIG. 24, one pair is constituted by each of the photo sensing elements 547a–547n and each of the light emitting elements 548a–548n. A photo signal S from the light emitting element 537 is once received by the plurality of photo sensing elements 547a to 547n. The light emitting elements 548a–548n emit the lights in response to the signal received and these lights are finally received by the photo sensing slement 538 in the LCD cover 2. Namely, the photo signal is connected by use of two pairs of photo coupling elements.

As described above, the signal transmission is constituted by the optical elements without a wire. Therefore, no mechanical burden is made for the signal connecting section when the LCD cover is opened and closed. Thus, it is possible to provide the image processing apparatus which can always form a stable image without fear of breaking and damages and the like of the signal lines as in the conventional apparatus.

In the image processing apparatus described in conjunction with FIGS. 6-1 and 6-2, it is also possible to constitute the apparatus in the manner such that the LCD panel and image processing section are integrally constituted and when the data inputting means such as the keyboard 513 or the like is operated, the image processing means starts the warmup, thereby preventing the leading time from being wasted as the standby time. In other words, in FIG. 6-2, the input from the keyboard 513 is detected by the CPU 514 and is displayed in the LCD displaying section 524, and at the same time the copier 526 is controlled by the signal line 527b, thereby performing the warmup for the formation of the image. In addition, a switch to change over whether or not the copier is controlled in this way may be provided.

Next, an image processing apparatus in which operability of the display and copy is improved using two sides of the plane display will be explained.

Figure 25:
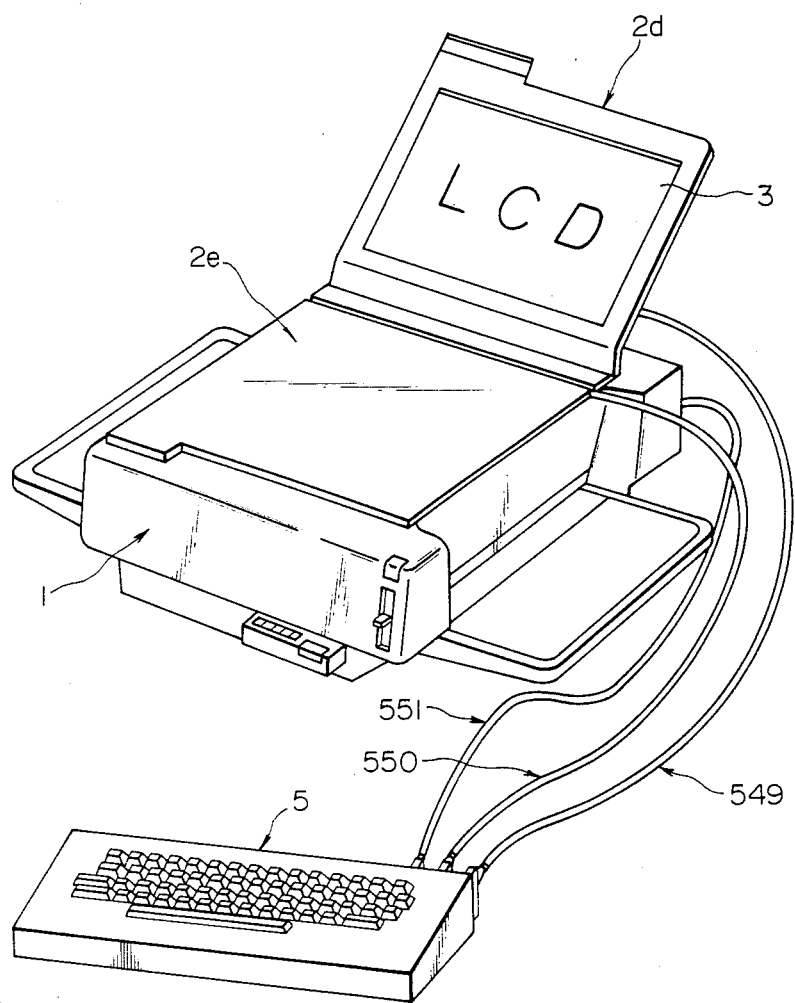
FIG. 25 is a perspective view of the image processing apparatus to which the present invention is applied.

FIG. 25 is a perspective view of one example of the image processing apparatus of the electrophotographic type embodying the present invention. A A numeral 2e denotes a reflection type liquid crystal display for the copy which is formed like a cover and 2d is a reflection type liquid crystal display formed like a cover which is used to confirm and correct information of the next page or the like. These reflection type LCD apparatuses 2e and 2d are respectively connected to the personal computer 5 through cables 549 and 550. A cable 551 connects the personal computer 5 and H) copier main body 1. On one hand, although the three cables 549, 550 and 551 are used in FIG. 25, they may be combined as a single cable.

In case of obtaining a hard copy of the information of the display panel of the LCD panel instead of an ordinary document copy, the reflection type LCD 2e for the copy between the two reflection type LCDs 2d and 2e formed like covers as shown in the diagram is put down in the similar manner as in case of obtaining a hard copy of the conventional display panel as illustrated in the diagram.

Figure 26:
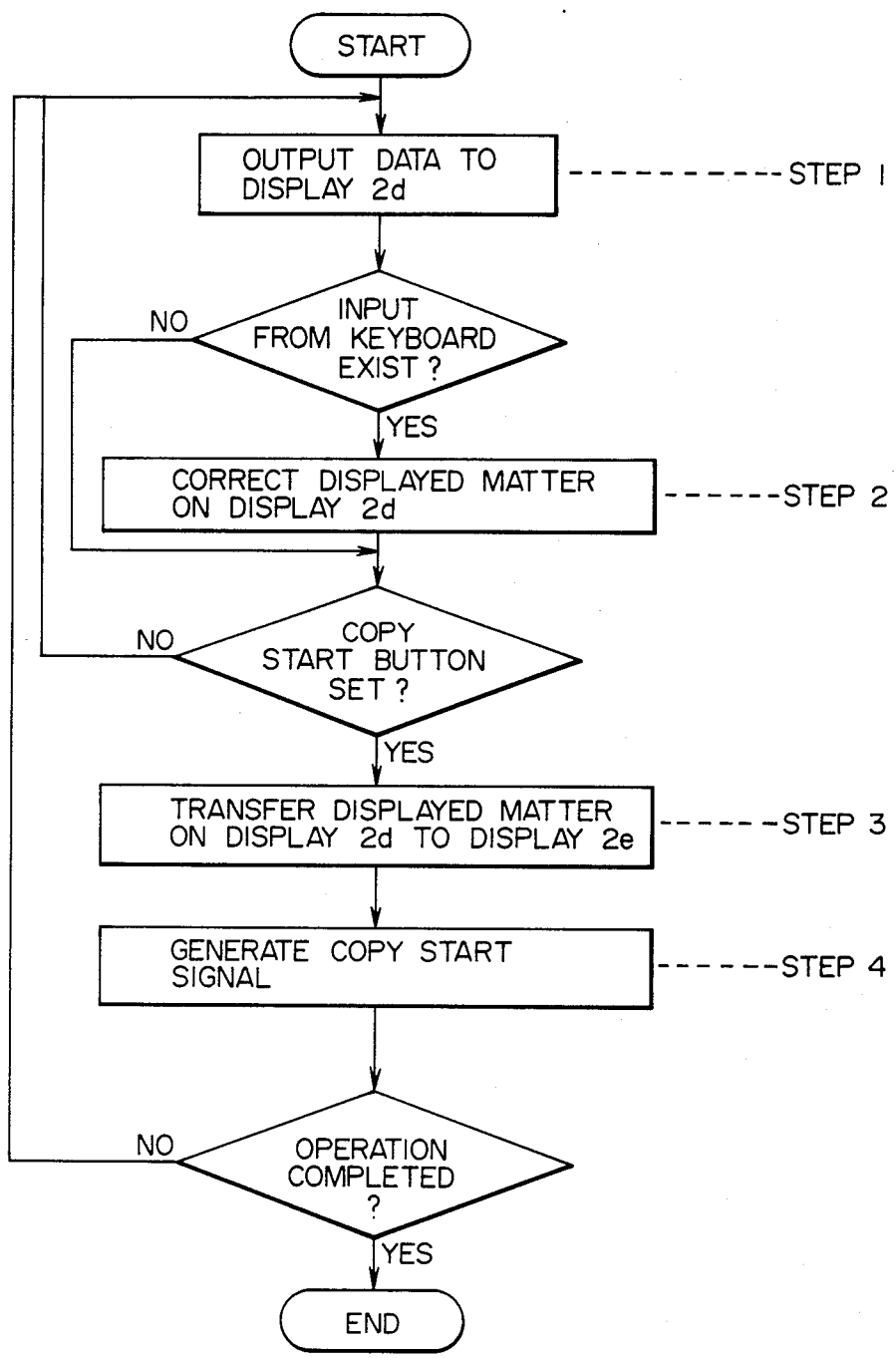
FIG. 26 is a diagram showing a flowchart for the operation of the present invention.

FIG. 26 shows a flowchart for the operation of the present invention. First, the output from the personal computer 5 is displayed on the reflection type LCD 2d (step 1) and the displayed matter is corrected and confirmed by inputting from the keyboard of the personal computer 5 (step 2). This displayed matter is transferred as the display data to the reflection type LCD 2e by setting a copy start button on the keyboard, so that the copy is started (steps 3 and 4). While the displayed matter on the LCD panel 2e is being copied, the information which should be copied next is displayed on the display panel of the LCD 2d and the displayed matter thereon is similarly corrected and confirmed. After completion of the correcting and checking operations and the copy, the displayed matter on the display 2d is transferred to the display 2e as mentioned above. Thereafter, by repeating the above operations, there is no need to perform the opening and closing operations of the cover display 2d which have been conventionally required whenever the displayed matter is corrected, checked and copied. Also, while the displayed matter on one display is being copied, the next information to be copied can be corrected and checked by the other display. In addition, the user can operate this copying operation on only the keyboard of the personal computer 5. Thus, this makes it possible to constitute the display copier in which the operability is remarkably improved as compared with the conventional type and the copying operation time can be extremely shortened. The display 2d is not necessarily formed like a cover.

Figure 27:
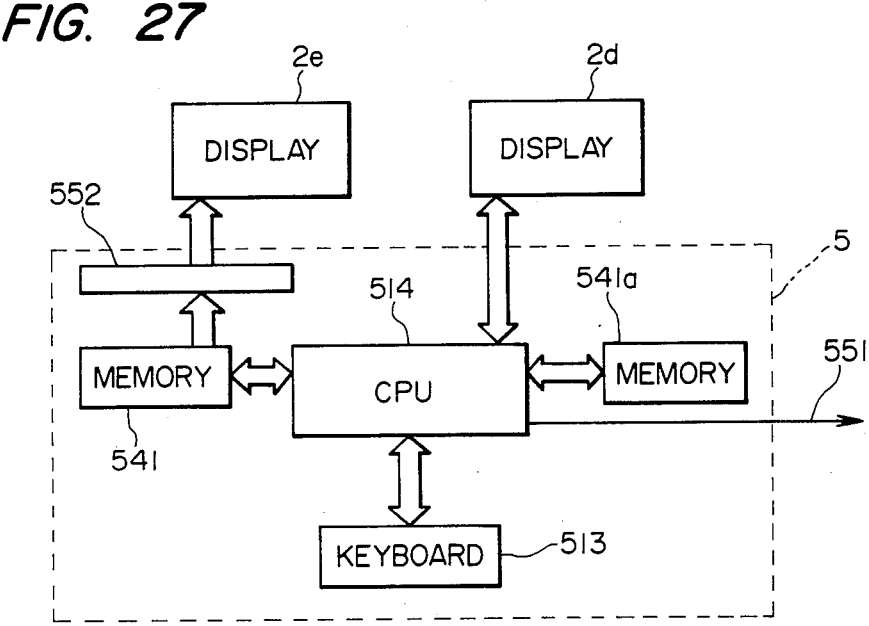
FIG. 27 is a block diagram of the image processing apparatus having two display units.

FIG. 27 is a block diagram of an embodiment of the present invention. The personal computer 5 comprises: the memories 541 and 541a; the central processing unit (CPU) 514; a transfer circuit 552 to transfer the data of the memory 541; and the keyboard 513 to designate the address. The input from the keyboard 513 or the data which has already been stored in the memory 541a is processed by the CPU 514 in accordance with the program stored in the memory and is output on the display 2d. This displayed matter and the data in the memory 541a are corrected by the input from the keyboard 513. The data in the memory 541a is transferred to the memory 541 in response to a transfer start signal by setting the copy start button on the keyboard 513. The data in the memory 541 is output to the display 2e by the transfer circuit 552 and the copy start signal is transferred to the copier main body 1 through the cable 551, so that the copy of this displayed matter is started. While the data is being output to the display 2e, the input from the keyboard 513 or the data in the memory 541a which should be copied next is output to the display 2d and is corrected similarly. After this correction and the hard copy of the displayed matter on the display 2e were completed, the data in the memory 541a is transferred to the memory 541 as mentioned above, thereafter the foregoing operations are repeated.

In this way, while the data which should be copied is being output to the display 2e for copy, the next data to be copied is simultaneously output on the display 2d for correction and it can be corrected and checked.

In addition, in the foregoing embodiment, the two reflection type LCDs formed like the original cover were used. However, they may be constituted such that, e.g., the sides of the non-indicating sections are retained, namely, they are combined as a single form by retaining those sides. On one hand, for example, the copying display 2d may be arranged merely as the display adjacent to the personal computer without constituting like an original cover.

Figure 28:
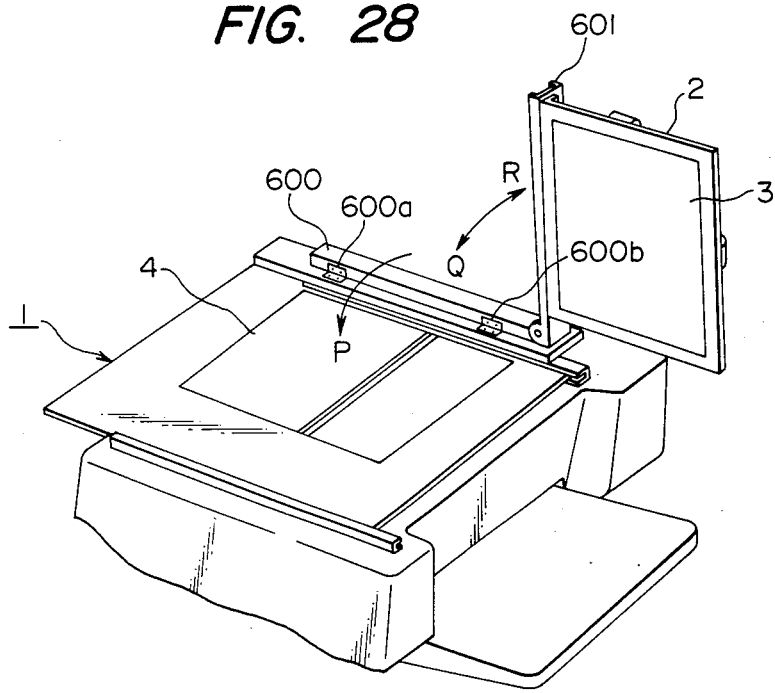
FIG. 28 is a perspective view of the image processing apparatus in which the original cover is rotatable.

Next, the image processing apparatus which is constituted such that the image displayed on the plane display can be converted so as to be easily seen as needed will be explained FIG. 28 shows an embodiment of the present invention. The original placing section 4 is formed on the top face of the copier 1. A supporting member 600 is rotatably attached to one side of the section 4 through hinges 600a and 600b. A supporting rod 601 is attached to one end of the supporting member 600. This rod 601 is rotatable between the location where it overlaps on the supporting member 600 and the location where it is rotated by 90° from that overlapped position in the apparatus shown in the diagram.

The original presser plate 2 of the copier is attached to the supporting rod 601 and the display panel 3 such as a liquid crystal panel as shown in FIG. 1 is further arranged in this original presser plate 2.

FIG. 28 illustrates the supporting rod 601 which is located at the rotated position for the supporting member 600. To allow the copier to perform the inherent copying operation thereof, the supporting rod 601 and the original presser plate 2 attached thereto are rotated in the direction indicated by an arrow Q in the diagram so as to allow the supporting rod 601 to overlap on the supporting member 600. An original is placed on the original placing section 4. Thereafter, the integrated components consisting of the original presser plate 2, supporting rod 601 and supporting member 600 are rotated in the direction indicated by an arrow P using the hinges 600a and 600b and press the original. Then, the original is copied in a known manner.

In addition, in case of using the display panel 3 arranged in the presser plate 2 as mentioned above, it is maintained at the location (longitudinal location) shown in FIG. 28 or at the location (lateral location) where it is rotated in the direction of the arrow Q, depending upon the direction of the output image. In this way, it is also possible to check the output images in any direction at the location so as to be easily seen.

Further, to obtain the hard copy of the output image, the display panel may be used as an original and may be placed on the original placing section so as to face it in the foregoing manner.

Figure 29:
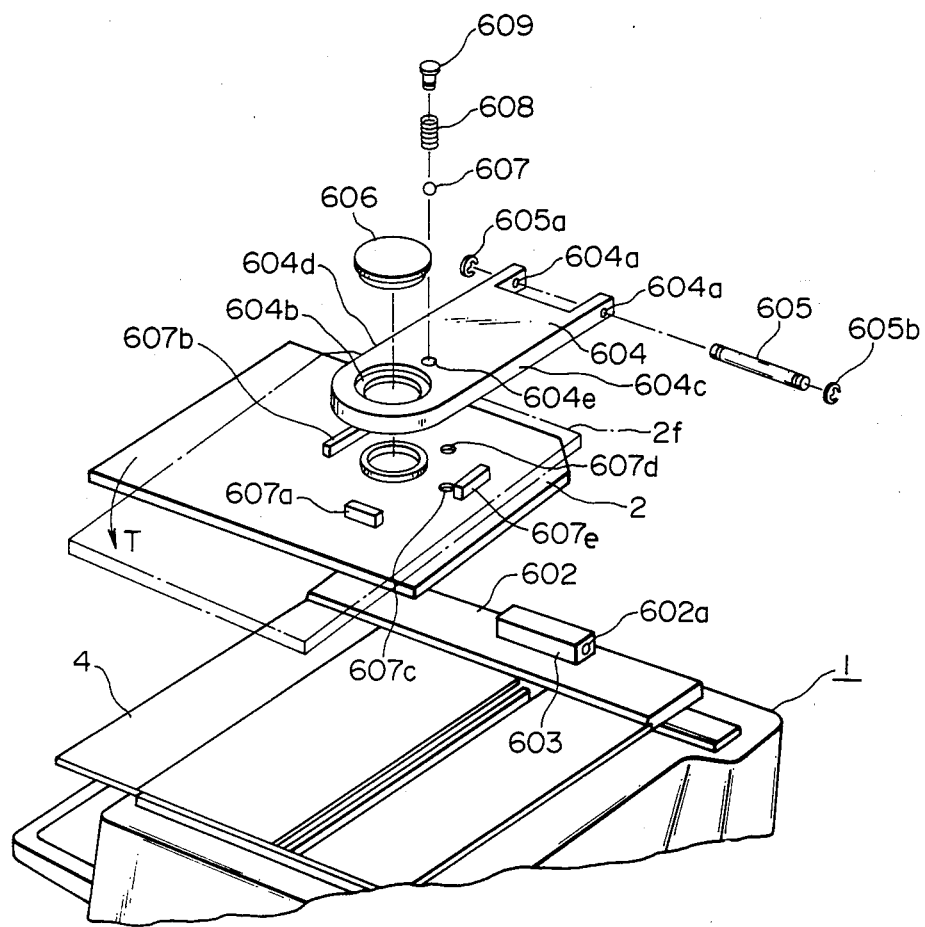
FIG. 29 is a detailed diagram of a rotational section of the original cover.

FIG. 29 illustrates another embodiment of the present invention. A supporting member 602 is fixed to one side edge of the original placing section 4 on the top face of the copier 1. A projecting portion 603 in which a through hole 602a is formed is integrally formed on the supporting member 602. A numeral 604 indicates a presser plate supporting arm and a pair of projections are formed at one end thereof so as to loosely sandwich the projecting portion 603. A hole 604a is formed in each of these projections. Those holes 604a and through hole 602a are aligned in position and a pin 605 is loosely inserted therein and both ends of this pin are fixed by fastening washers 605a and 605b, thereby rotatably supporting the arm 604.

An opening 604b is formed in the free end of the arm 604 and a short axis 606 is inserted therein. The original presser plate 2 is rotatably attached to the arm 604 through this short axis 606 such that the gap between the lower surface (not shown) of the arm and the upper surface of the presser plate 2 becomes gradually small.

A through hole 604e is formed in the arm 604 and a ball 607 is loosely inserted in this through hole. A spring 608 is inserted in this hole 604e so as to abut on the ball 607. Further, the removal of these spring 608 and ball 607 is obstructed by a presser screw 609. Thus, the ball 607 is depressed by the spring 608 and abuts on the upper surface of the original presser plate 2 shown in the diagram.

Two small holes 607c and 607d are formed in the upper surface (shown in the diagram) of the original presser plate 2 on the locus on which the ball 607 abuts. The small hole 607d is formed at the location where a part of the ball 607 is inserted in the hole 607d, thereby setting the presser plate 2 into the semi-fixed state for the arm 604 when the presser plate 2 in which the hole 607d is formed, namely, when the display panel (not shown) consisting of the LCD panel or the like is located at the position indicated by the solid line in FIG. 29 (the ordinary location of the original cover). Similarly, the small hole 607c is formed at the location where it elastically engages the ball 607 when the presser plate 2 is rotated by 90° to the location indicated by the alternate long and short dash line in FIG. 29 (i.e., presser plate 2f) in the direction indicated by an arrow T.

In addition, projections 607a, 607b and 607e are provided on the upper surface of the presser plate 2. These projections function as the stoppers by abutting on side edges 604c and 604d of the arm 604, thereby preventing the ball 607 from being rotated over the locations where it respectively engages the small holes 607c and 607d when the presser plate 2 is rotated between the location indicated by the solid line and the location indicated by the alternate long and short dash line in FIG. 29.

With such an arrangement, in case of using the copier 1 as an ordinary copying machine, the presser plate 2 is moved to the location of the solid line in FIG. 29 and the presser plate 2 is rotationally opened and closed together with the arm 604, thereby holding the original which was put on the original placing section 4. On the other hand, in case of checking the displayed content on the display panel fixed to the presser plate similarly to the case shown in FIG. 28, the presser plate 2 is properly moved together with the display panel to the location of the solid line or to the location of the alternate long and short dash line and is semi-fixed at each location. In this state, the displayed matter can be seen. To copy the displayed matter, the presser plate 2 is moved in the location of the solid line and the display panel itself is used as an original similarly to the case of the foregoing copying operation, thereby enabling a hard copy to be obtained.

In the embodiment shown in FIG. 29, the display panel and presser plate are rotated around the short axis as a center, so that the position of the display panel when it was rotated is not so moved than that of the embodiment shown in FIG. 28. Therefore, the display panel can be easily seen.

Also, in the apparatus shown in FIG. 29, although the ball click is used as the means for semi-fixing the presser plate and display panel, this means is not limited to this. For example, any other appropriate means such that the screw provided in the arm 604 is screwed and the presser plate is pressed and fixed by the point of the screw, or the like may be employed.

Next, an example will be explained whereby the display screen is scrolled without rotating the original cover on the basis of the same spirit as above.

Figure 30:
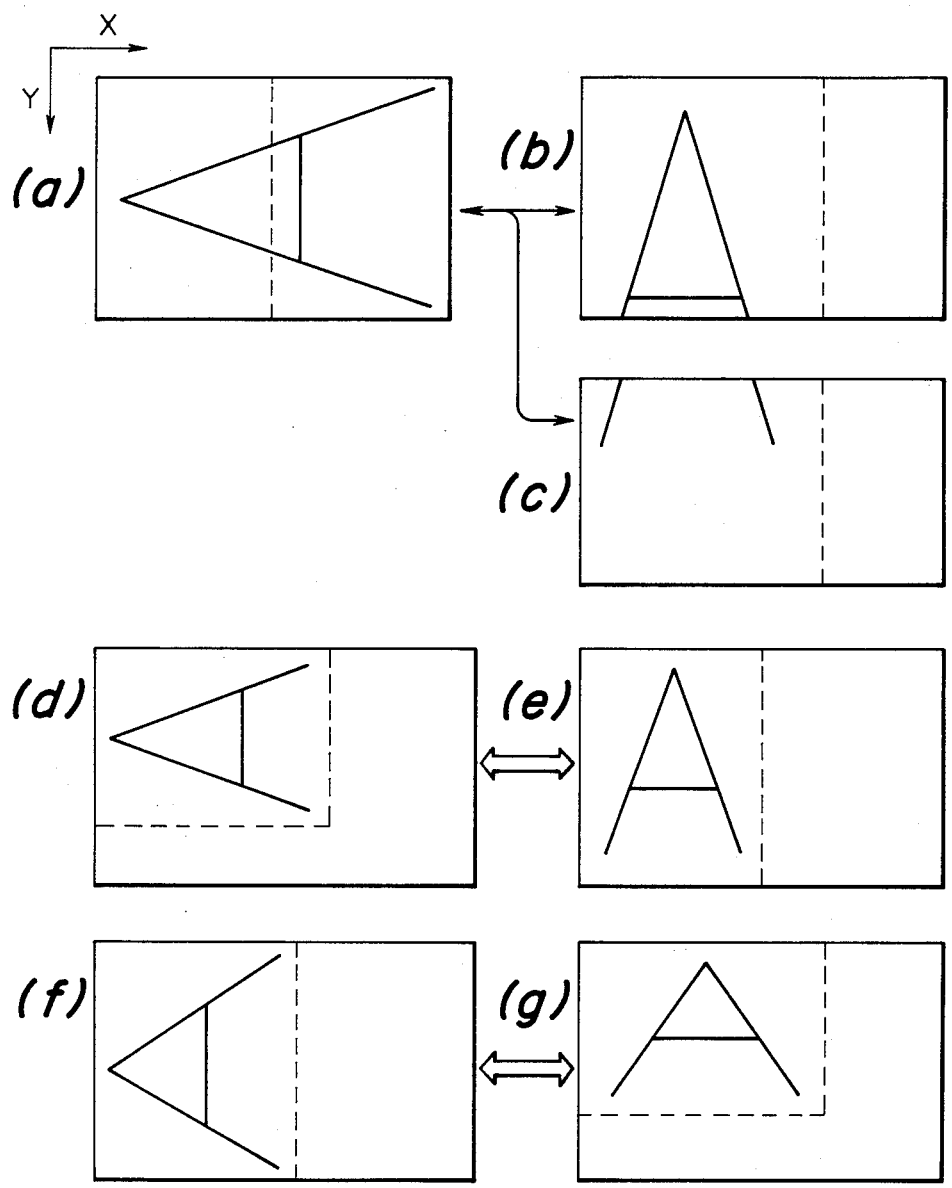
FIG. 30 is a diagram to explain display information on the screen.

FIG. 30 is a diagram showing the states in that various information are displayed on the display of the A3 panel. The information is difficult to read in case of (a), so it is necessary to convert the coordinates X-Y of the information to that as shown in (b) and display it and thereafter to shift in the direction of an X axis as shown in (c) and display the whole region. However, in the states of (b) and (c), the reproduced image cannot be obtained in a sheet of transfer material. Finally, the image has to be converted to the state of (a) and copied. On one hand, although A4 information is displayed in (d), if it is converted to the form of (e) and displayed, it will be easily read. However, both (d) and (e) are useful to obtain a hard copy. When the feeding direction of the transfer material is the lateral direction (A4 cassette), (e) is adopted; conversely, when it is the longitudinal direction (A4 R cassette), (d) is selected, then a hard copy may be copied. Similarly, in the case where the A4 information is indicated as (g), it may be converted to the form of (f) and a hard copy may be obtained if the feeding direction of the transfer material is the lateral direction. As described above, it is necessary to convert the coordinates of the information sent in accordance with the content thereof and the cassette selected (or installed) unless otherwise specified. As well as the above conversion, a variable magnification factor function may be added. The above-mentioned conversion of coordinates, change-over of various magnification factors, and the like may be performed by the copier main body 1 or key means such as the keyboard or the like, or may be executed by being interlocked with the original cover 2.

Figure 31:
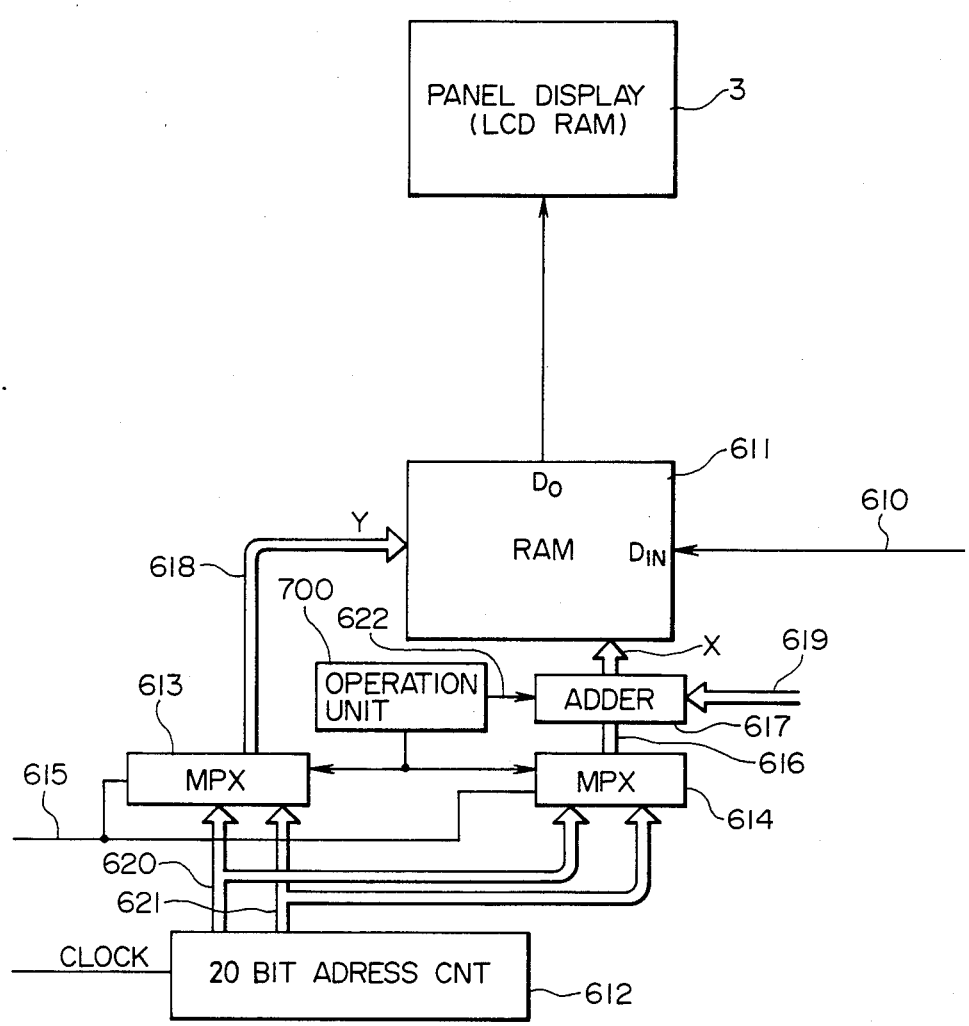
FIG. 31 is a control block diagram of a display section.

FIG. 31 shows a control block diagram of the above-mentioned plane display panel 3. A numeral 3 denotes the liquid crystal panel display corresponding to the A3 size mentioned above which consists of the cells of 2.4 dot/mm in both longitudinal and lateral directions. A RAM of about 1 Mbits (1024×730 dots) is built in this display 3. An RAM 611 has the same capacity as that of the above RAM and the binary video data 610 transmitted from the outside has been stored in the RAM 611. The display 3 again stores the data transferred from the RAM 611 and periodically reads out it, thereby displaying a still picture image by driving each cell of the liquid crystal.

On the other hand, an address counter 612 of 20 bits controls the writing into the picture memory 611 and the readout to the LCD RAM 3. The respective output signals of the lower significant ten bits and the higher significant ten bits of the 20-bit address counter 612 are input to multiplexers 613 and 614. Either one of those output signals is selected in response to a change-over signal 615, thereby addressing the picture memory 611. An output 616 of the multiplexer 614 is input to an adder 617 and a predetermined value is added thereto, so that the X coordinate of the picture memory 611 is addressed by this output. On one hand, the Y coordinate of the picture memory 611 is addressed by an output 618 of the multiplexer 613.

The case of writing of the external video data 610 will be then described.

The higher significant ten bits or the lower significant ten bits in the output signals of the address counter 612 are respectively selected at this time for the multiplexers 613 and 614.

Figure 32:
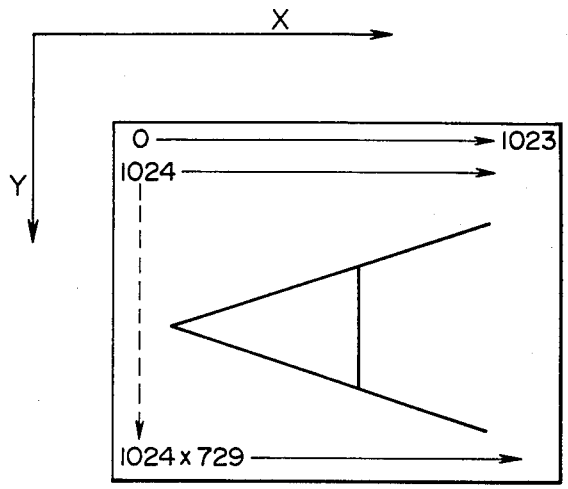
FIG. 32 is a diagram showing a memory map of display information.

Now, it is assumed that an addition value 619 to the adder 617 is 0, and the write address to the picture memory 611 is designated. Thus, the video data of A3 size is stored in the picture memory in accordance with an RAM map shown in FIG. 32. Next, the readout of the display data to the LCD panel will be explained. When it is now assumed that the higher significant bits are selected for the multiplexer 613 and the lower significant bits are selected for the multiplexer 614 on the readout of the multiplexers, the information (such as shown in FIG. 30(a) in case of A3) will be displayed on the LCD panel in the same state as that written in the picture memory 611. Then, the conversion from the indication of (a) to (b) will be explained. Depression of a coordinate conversion key of the operating section allows the lower significant ten bits to be selected for the multiplexer 613 and the higher significant ten bits to be selected for the multiplexer 614 by a signal line 620. The same value 0 as mentioned above is added to the adder 617. Since the higher and lower significant bits are reversely selected at this time, 1024 pixels (Y direction is the main scanning direction)×730 lines (X direction is the subscanning direction) are output as the data from the picture memory 611 in FIG. 32. Therefore, the images of which the rightmost portions of the image in FIGS. 30(a) and 32 were lost, or the image of which the data at the rightmost portion of the screen of (b) was lost is displayed as shown in FIG. 30(b). However, the image can be easily read since it is rotated by 90° with respect to (a).

Next, the indication of the image of the lost portion of FIG. 30(a) will be described. In the detailed diagram of FIG. 32, the lost data is the data of addresses 730 to 1023 in the X direction. To read out these addresses, the lower significant ten bits are selected for the multiplexer 613, while the higher significant ten bits are selected for the multiplexer 614, and in this state, 730 data are added as an initial value to the output of the multiplexer 614, i.e., to the address data in the X direction by the signal line 620 or 621 and a signal line 622, thereby addressing. The addition value 730 is added as the input 619 to the adder 617; however, it also can be set arbitrarily through the signal line 622 on the basis of the instruction by the operator.

After the information displayed was checked in accordance with the procedure mentioned before, it is returned to the indication state of FIG. 30(a) by the similar procedure and the copying operation is executed.

As described above, the essence of the present invention is not only to make the interpretation easy for the originals on which information was written longitudinally and laterally by rotating the image displayed on the plane display, but also to again execute the editing of the image such as the rotation or the like of the image after the interpretation in order to match the display image with recording conditions such as the transfer size and feeding direction of the transfer paper. For instance, in case of enlarging or reducing only the necessary portion in the data displayed and copying, or in case of shifting the whole image by a few millimeters in the X direction in consideration of a binding margin of the transfer material and copying, or the like as well, the essence of the invention can be implemented by the similar method. On the other hand, a graphic display controller such as μPD7220 (Nippon Electric Co., Ltd.) is commercially available. It is also possible to perform the rotation, scroll, enlargement, reduction, etc. through a software by control commands and parameters which are sent from a microprocessor. Also, the plane display is not limited to the plane form, nor to the liquid crystal.

Next, the image processing apparatus will be explained whereby a liquid crystal display panel using no deflecting plate is used in the above-described display section and a clear hard copy is obtained with a low cost.

Figure 33:
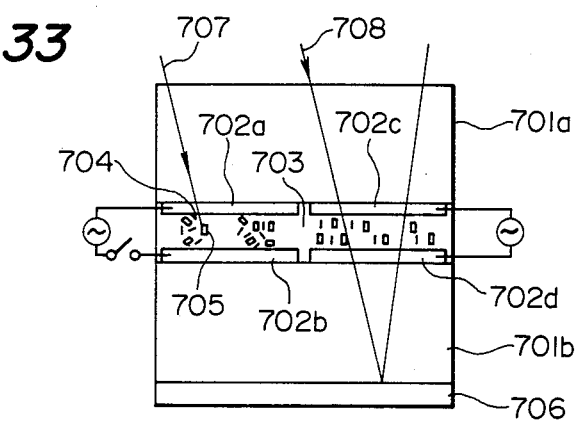
FIG. 33 is a cross sectional view of a liquid crystal display apparatus which is employed to the present invention.

FIG. 33 shows a cross sectional view of the main part of a liquid crystal display apparatus which is employed to the present invention, in which numerals 701a and 701b denote transparent substrates such as a glass or the like. Transparent electrodes 702a, 702b, 702c, and 702d are attached to the inner surfaces thereof which face one another. A cholesteric liquid crystal 703 of which the molecular axis are twisted is sealingly filled in the space between the substrates such that the spiral pitch is approx. 0.3 μm. Further, a dichroism dye is mixed to this liquid crystal. In the diagram, the liquid crystal molecules are diagrammatically indicated by a numeral 704, while the dye molecules are represented at 705, respectively. A reflecting plate is shown at 706 in the diagram.

Since no electric field is applied between the electrodes 702a and 702b, the liquid crystal molecules are spirally arranged and the dye molecules are also spirally arranged in association with the above helical arrangement. Therefore, when a light 707 is projected onto this portion, by setting a thickness of liquid crystal to be larger than the pitch of spiral, the dye molecules can effectively absorb the lights in all vibrating directions, so that the light 707 is not transmitted through the cell. On the other hand, since an electric field has been applied to the electrodes 702c and 702d, the liquid crystal molecules in this portion change from the cholesteric phase to the homeotropic phase and become the homeotropic nematic phase. The arrangement of the dye molecules is also changed in association with that change, thereby causing the absorbing property to disappear. Thus, a light 708 transmits the liquid crystal and passes through the glass plate 701b and reaches the reflecting plate 706. The light is reflected by this plate 706 and again passes through the glass plate 701b, liquid crystal and glass plate 701a and is radiated.

Consequently, when the liquid crystal cell is seen from the upper portion in the diagram, the portion near the electrode 702a is dark, while the portion near the electrode 702c is light. Therefore, by arranging the liquid crystal display means as mentioned above like a matrix on the display panel 3 of the apparatus, and by applying a known matrix address driving system, desired image information can be obtained.

Figure 34:
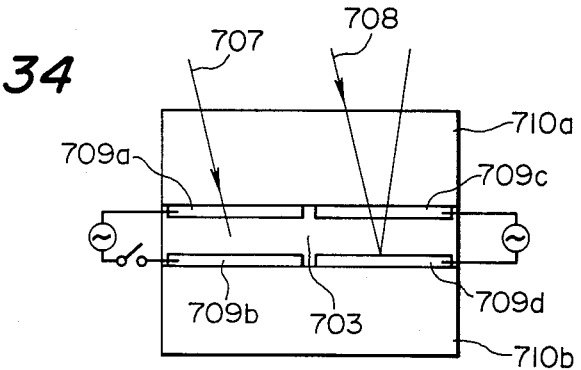
FIG. 34 is a cross sectional view of another liquid crystal display apparatus which is employed to the present invention.

FIG. 34 shows another example of the liquid crystal cell. Electrodes 709b and 709d formed by material having high reflectances are arranged in place of the transparent electrodes as the electrodes on the side opposite to the side where the light is projected. The reflecting plate 706 shown in FIG. 33 is removed.

In this liquid crystal apparatus also with such an arrangement, it will be easily understood that visual information can be obtained in the similar manner as mentioned above. In general, substrates 710a and 710b have thicknesses of hundreds of micrometers (μm) to a few millimeters. On one hand, a thickness of liquid crystal layer is about a few micrometers to tens of micrometers and is far thinner than the substrates. Therefore, in the reflection type LCD such that the projected light passes through the substrate 701b and is reflected by the reflecting plate 706 as shown in FIG. 33, there is a problem such that a shade is caused and the image becomes unclear. However, such a drawback is not caused in the LCD shown in FIG. 34.

Further, in the case where the substrate 701b itself is formed of a substance having a large reflectance instead of transparent material as well, a similar action and effect are obtained.

As described above, in this embodiment of the invention, the LCD panel using no deflecting plate is arranged on the inner surface of the cover which is closably disposed for the original placing section of the image processing apparatus, and the light source for exposure in the image processing mechanism section is used for reproduction of the information displayed on the display panel. Therefore, by using a dye in which light loss is less and an order parameter is large, bright indication of a large contrast is obtained even in the reflected indication. A clear hard copy is derived at a low cost without extensive modification of light source and the mechanical portion. As a result, this invention largely contributes to variation of image processing apparatus and realization of system configuration thereof.

The above-mentioned conversion of display image will be further described in detail. If, e.g., HD63484 (Hitachi, Ltd.) is used as a graphic display controller (ACRTC (advanced CRT controller)), various graphic functions can be performed by hardware, so that it is possible to execute the screen division, horizontal division, independent window, and superimposing of two picture images.

Figure 35:
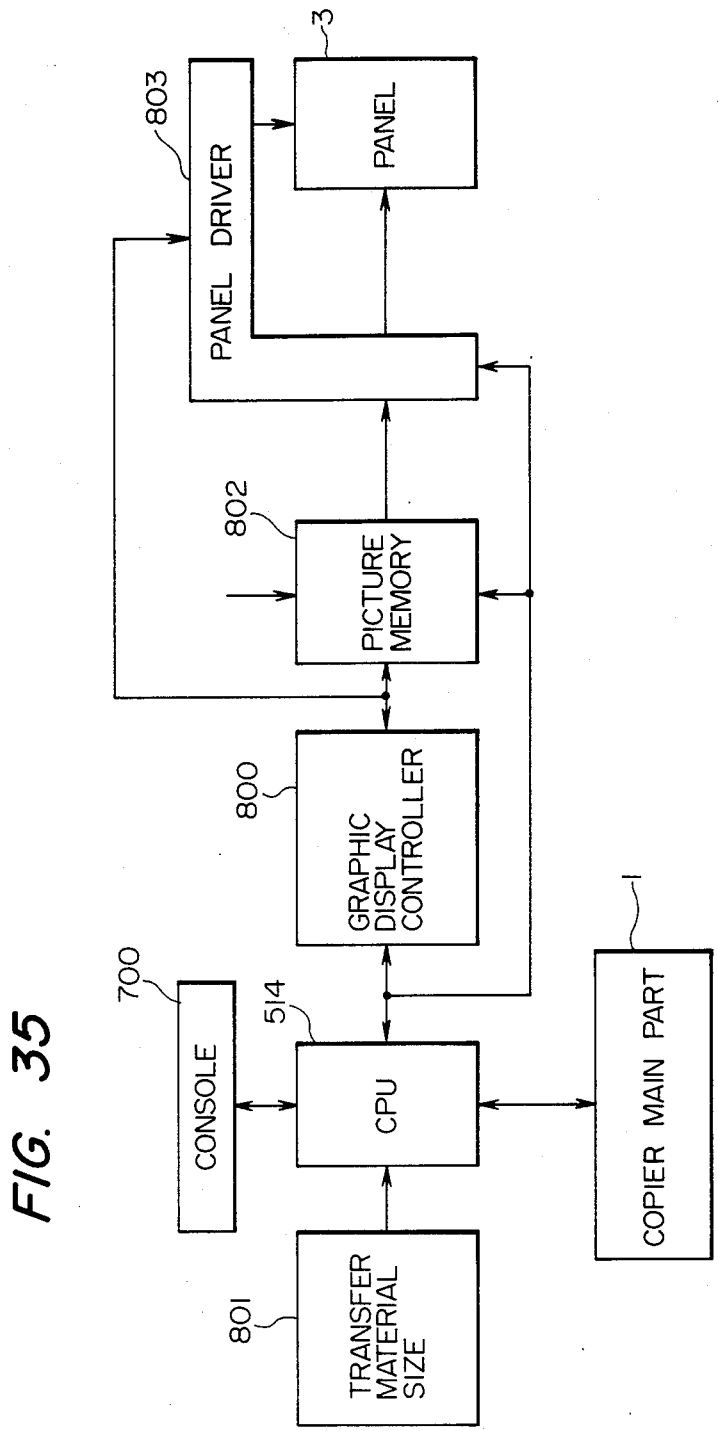
FIG. 35 is a constitutional block diagram to edit a display image.

FIG. 35 shows a constitutional block diagram to perform the editing of the display image. The CPU 514 detects the depressions of various operating keys of the console section 700 and controls the copying process for the original exposing lamp, electrostatic drum driving motor, etc. On one hand, the CPU 514 receives the inputs from various sensors to sense a size of transfer paper, etc. The CPU 514 is connected to a graphic display controller 800 and commands are exchanged therebetween, thereby storing the images transferred from the outside in a picture memory 802 or performing the image processings such as enlargement, movement, trimming, etc. for the images stored. Thereafter, the CPU 514 drives a panel driver 803, thereby enabling a desired processed image to be displayed on the panel 3.

Therefore, for example, when the paper size selected by a transfer material size sensing circuit 801 is recognized, the CPU 514 outputs a command for, e.g., longitudinal-lateral conversion to the graphic display controller 800 in order to allow the display image to match the above size, or it commands the contraction or magnification factors in both of the longitudinal and lateral directions so as to match the size. Due to this, the information can be copied on the paper of the paper size selected without losing the information. On the other hand, the graphic display controller 800 controls the picture memory address in accordance with a constant algorithm on the basis of the above command. In addition, the graphic display controller can also perform the processing of the image data in association with the processings for enlargement, contraction and rotation, for example, the correction for the lack of thin lines at the time of contraction processing, and the like.

Further, the controller 800 can perform the trimming for a part of a desired display data in accordance with the key operation arranged in the console section and can easily allow the image which is transferred on the transfer material to be once monitored on the panel. In response to the above key operation, it is possible to freely select the display of the original picture transferred, monitor display on the screen after various kinds of editings, display of the image which is actually copied, or the like.

Also, as mentioned above, the picture image can be obviously switched synchronously with the opening/closure of the panel 3 or insertion of the transfer material as well as the key input.

What is claimed is:

1. An image processing apparatus comprising:
   inputting means for inputting data;
   displaying means for displaying an image in response to an information signal from said inputting means;
   an original plate for placing an original thereon;
   a presser plate for pressing said original placed on said original plate;
   exposing means for exposing said original pressed toward said original plate by said presser plate;
   image processing means for processing an original image in response to reflected light from said original exposed by said exposing means and selectively forming said original and said displayed image on the basis of light provided when said displayed image is processed; and
   lighting means, provided at the back side of said displaying means, for lighting only portions of said displayed image at an exposure position, wherein said displaying means is arranged on the side of the pressing surface of said presser plate.

2. An apparatus according to claim 1, wherein said lighting means includes control means for controlling the amount of light in response to recording conditions of said image processing means.

3. An apparatus according to claim 2, wherein the light from said lighting means for image displaying and for image formation is different for each.

4. An apparatus according to claim 2, wherein said lighting means includes a plurality of light emitting elements arranged in the form of a matrix on the back surface of said displaying means, said control means controlling the amount of emitted light from said light emitting elements.

5. An apparatus according to claim 4, wherein said control means increases the amount of light for said displayed image which is at an exposure position, in the case of image formation of said displayed image.

6. An apparatus according to claim 1, wherein said lighting means lights the entire surface of said displaying means to provide a clear display.

7. An image processing apparatus according to claim 1, wherein when said displayed image is formed, said lighting means lights an exposed portion of said displayed image which moves in synchronization with the image formation.

8. An image processing apparatus according to claim 1, wherein when said displayed image is formed, said image processing means processes said displayed image in response to light both from said lighting means and from said exposing means.

9. An image processing apparatus according to claim 1, wherein said image processing means comprises a photosensitive material and forms a latent image on said photosensitive material in response to light from said exposing means and said lighting means.

10. An image processing apparatus according to claim 1, wherein said image processing means comprises means for moving said displaying means in synchronization with image formation and, wherein said lighting means lights said displayed image during the relative movement of said displaying means.

* * * * *

UNITED STATES PATENT AND TRADEMARK OFFICE
CERTIFICATE OF CORRECTION

PATENT NO. : 4,714,940

DATED : December 22, 1987

INVENTOR(S) : YUTAKA INOUE ET AL.

It is certified that error appears in the above-identified patent and that said Letters Patent is hereby corrected as shown below:

Title page:

[54]:

Line 3, "DATE" should read --DATA--.

[56]:

References Cited, "Platt, III .......... 355/464" should read --Platt, III .......... 355/14--;
Attorney, Agent or Firm, "Cella Harper" should read --Cella, Harper--.

[57]:

Line 2, "which" should be deleted;
Line 3, "copy" should read --copying--:
Line 5, "is disclosed" should be deleted; and
Line 7, "can" should read --can provide a--.

DRAWING SHEET 20 OF 22:

Fig. 31, box 612, "ADRESS" should read --ADDRESS--.

UNITED STATES PATENT AND TRADEMARK OFFICE
CERTIFICATE OF CORRECTION

PATENT NO. : 4,714,940

DATED : December 22, 1987

INVENTOR(S) : YUTAKA INOUE ET AL.

It is certified that error appears in the above-identified patent and that said Letters Patent is hereby corrected as shown below:

COLUMN 1:

Line 4, "DATE" should read --DATA--.

COLUMN 2:

Line 2, "among," should read --among--; and
    Line 36, "the that" should read --that--.

COLUMN 3:

Line 36, "less" should read --smaller--.

COLUMN 4:

Line 56, "that" should read --which--;
    Line 63, "correcte" should read --corrected--; and
    Line 66, "sticking" should read --retaining--.

COLUMN 5:

Line 34, "copier" should read --copier as it is--; and
    Line 39, "then" should read --now--.

UNITED STATES PATENT AND TRADEMARK OFFICE
CERTIFICATE OF CORRECTION

PATENT NO. : 4,714,940

DATED : December 22, 1987

INVENTOR(S) : YUTAKA INOUE ET AL.

It is certified that error appears in the above-identified patent and that said Letters Patent is hereby corrected as shown below:

COLUMN 7:

Line 63, "is" should read --in--.

COLUMN 9:

Line 46, "section" should read --sectional--.

COLUMN 12:

Lines 18-19, "electrodes divided." should read --divided electrodes.--; and
    Line 20, "electrodes 528 and 529 divided." should read --divided electrodes 528 and 529.--.

COLUMN 13:

Line 3, "a" should read --an--; and
    Line 21, "used" should read --be used--.

UNITED STATES PATENT AND TRADEMARK OFFICE
CERTIFICATE OF CORRECTION

PATENT NO. : 4,714,940

DATED : December 22, 1987

INVENTOR(S) : YUTAKA INOUE ET AL.

It is certified that error appears in the above-identified patent and that said Letters Patent is hereby corrected as shown below:

COLUMN 14:

Line 8, "irregularly" should read --irregular--;
    Line 60, "those" should read --that--; and
    Line 62, "set" should be deleted.

COLUMN 15:

Line 9, "be also" should read --also be--; and
    Line 26, "to be obtained" should read --to obtain--.

COLUMN 16:

Line 39, "maintaned" should read --maintained--.

COLUMN 17:

Line 25, "be" should be deleted.

COLUMN 18:

Line 35, "be always" should read --always be--.

UNITED STATES PATENT AND TRADEMARK OFFICE
CERTIFICATE OF CORRECTION

PATENT NO. : 4,714,940

DATED : December 22, 1987

INVENTOR(S) : YUTAKA INOUE ET AL.

It is certified that error appears in the above-identified patent and that said Letters Patent is hereby corrected as shown below:

COLUMN 19:

Line 66, "wellknown" should read --well known--.

COLUMN 20:

Line 35, "sensing" should read --sense--; and
    Line 41, "warmup" should read --warming up--.

COLUMN 21:

Line 68, "is further come" should read --further comes--.

COLUMN 22:

Line 53, "weighted." should read --weight.--.

COLUMN 24:

Line 31, "slement" should read --element--; and
    Line 63, "AA" should read --A--.

UNITED STATES PATENT AND TRADEMARK OFFICE
CERTIFICATE OF CORRECTION

PATENT NO. : 4,714,940

DATED : December 22, 1987

INVENTOR(S) : YUTAKA INOUE ET AL.

It is certified that error appears in the above-identified patent and that said Letters Patent is hereby corrected as shown below:

COLUMN 25:

Line 3, "H)" should be deleted.

COLUMN 26:

Line 18, "needed" should read --needed,--; and
Line 19, "explained" should read --explained.--.

COLUMN 27:

Line 14, "these" should read --this--; and
Line 66, "so moved than" should read --as moved as--.

COLUMN 28:

Line 11, "that" should read --which--;
Line 13, "be" should be deleted; and
Line 49, "ARAM" should read --A RAM--.

UNITED STATES PATENT AND TRADEMARK OFFICE
CERTIFICATE OF CORRECTION

PATENT NO. : 4,714,940

DATED : December 22, 1987

INVENTOR(S) : YUTAKA INOUE ET AL.

It is certified that error appears in the above-identified patent and that said Letters Patent is hereby corrected as shown below:

COLUMN 29:

Line 4, "then" should read --now--; and
    Line 46, "initical" should read --initial--.

COLUMN 30:

Line 25, "are" should read --is--.

COLUMN 32:

Line 16, "display" should read --and display--.

Signed and Sealed this

Sixth Day of September, 1988

Attest:

DONALD J. QUIGG

Attesting Officer      Commissioner of Patents and Trademarks